United States Patent
Cao et al.

(10) Patent No.: US 11,722,354 B2
(45) Date of Patent: Aug. 8, 2023

(54) EHT CAPABILITY DESIGN FOR PPE THRESHOLD

(71) Applicant: NXP USA, Inc., Austin, TX (US)

(72) Inventors: Rui Cao, Sunnyvale, CA (US); Sudhir Srinivasa, Los Gatos, CA (US); Hongyuan Zhang, Fremont, CA (US); Liwen Chu, San Ramon, CA (US)

(73) Assignee: NXP USA, Inc., Austin, TX (US)

( * ) Notice: Subject to any disclaimer, the term of this patent is extended or adjusted under 35 U.S.C. 154(b) by 8 days.

(21) Appl. No.: 17/386,242

(22) Filed: Jul. 27, 2021

(65) Prior Publication Data

US 2022/0029872 A1    Jan. 27, 2022

Related U.S. Application Data

(60) Provisional application No. 63/145,169, filed on Feb. 3, 2021, provisional application No. 63/138,562, filed on Jan. 18, 2021, provisional application No. 63/124,175, filed on Dec. 11, 2020, provisional application No. 63/067,904, filed on Aug. 20, 2020,
(Continued)

(51) Int. Cl.
*H04L 27/34* (2006.01)
*H04W 28/06* (2009.01)

(52) U.S. Cl.
CPC ......... *H04L 27/3461* (2013.01); *H04W 28/06* (2013.01)

(58) Field of Classification Search
None
See application file for complete search history.

(56) References Cited

U.S. PATENT DOCUMENTS

| 10,230,490 B2 | 3/2019 | Sun et al. |
| 10,447,519 B2 | 10/2019 | Huang et al. |
| 10,833,828 B2 | 11/2020 | Wang et al. |

(Continued)

FOREIGN PATENT DOCUMENTS

| EP | 3654559 A1 | 5/2020 |
| WO | WO 2017122240 A1 | 7/2017 |

OTHER PUBLICATIONS

Notice of Allowance U.S. Appl. No. 17/319,060 dated Jul. 8, 2022.
(Continued)

*Primary Examiner* — Diane L Lo

(57) ABSTRACT

In an 802.11be wireless system, a receiving station device signals a packet padding capability in a wireless area network in accordance with an Extremely High Throughput (EHT) communication protocol by constructing a MAC control management frame to include an EHT capability element indicating whether a packet extension value longer than 16 µs is supported by the receiving station device, where one or more fields in the EHT capability element include (1) a common nominal packet padding field having a plurality of values to signal different packet extension values for use with all transmission constellations, spatial streams Nss, and resource unit (RU) allocations supported by the first STA device, including at least one packet extension value longer than 16 µs; and/or (2) a PHY packet
(Continued)

| NOMINAL PACKET PADDING | ENCODING OPTION 2 |
|---|---|
| 0 | Set to 0 if the nominal packet padding is 0 µs for all constellations, NSS and RU allocations the STA supports. |
| 1 | Set to 1 if the nominal packet padding is 8 µs for all constellations, NSS and RU allocations the STA supports. |
| 2 | Set to 2 if the nominal packet padding is 16 µs for all constellations, NSS and RU allocations the STA supports. |
| 3 | Set to 3 if the nominal packet padding is New Max PE value (e.g., 20 or 24 µs) for all constellations, NSS and RU allocations the STA supports | extension threshold (PPET) field comprising a plurality of PPET values to signal packet extension values including at least one packet extension value longer than 16 μs.

25 Claims, 11 Drawing Sheets

Related U.S. Application Data provisional application No. 63/057,224, filed on Jul. 27, 2020.

(56) References Cited

U.S. PATENT DOCUMENTS

| | | | |
|---|---|---|---|
| 10,944,502 | B2 | 3/2021 | Sun et al. |
| 2015/0349995 | A1 | 12/2015 | Zhang et al. |
| 2016/0227437 | A1* | 8/2016 | Blanksby .................. H04L 1/00 |
| 2016/0241682 | A1 | 8/2016 | Xu et al. |
| 2016/0282858 | A1 | 9/2016 | Michalscheck et al. |
| 2016/0286012 | A1 | 9/2016 | Yu et al. |
| 2017/0332385 | A1 | 11/2017 | Shirali et al. |
| 2018/0011179 | A1* | 1/2018 | Zhang ..................... H04L 69/22 |
| 2018/0302256 | A1 | 10/2018 | Huang et al. |
| 2020/0037325 | A1 | 1/2020 | Chu et al. |
| 2020/0177425 | A1* | 6/2020 | Chen ................... H04L 27/2602 |
| 2021/0014811 | A1* | 1/2021 | Seok .................... H04W 76/15 |
| 2021/0258116 | A1* | 8/2021 | Chen ..................... H04L 5/0037 |
| 2021/0315025 | A1* | 10/2021 | Seok .................... H04L 1/0008 |
| 2022/0095347 | A1 | 3/2022 | Huang et al. |

OTHER PUBLICATIONS

Cailian Deng et al., IEEE 802.11be—Wi-Fi 7: New Challenges and Opportunities, IEEE, 2020 https://arxiv.org/pdf/2007.13401.pdf.

New H3C Technologies Co., Ltd., 802.11ax Technology White Paper, 2020.

Taewon Song et al., Performance Analysis of Synchronous Multi-Radio Multi-Link MAC Protocols in IFFF 802.11be Extremely High Throughput WLANs, Applied Sciences, 2021, 11, 317.

Evgeny Khorov et al., Current Status and Directions of IEEE 802.11be, the Future WiFi 7, May 8, 2020.

Yusuke Asai, New Wireless LAN Technology: 802.11ax, Nippon Telegraph and Telephone Corporation, MIC MRA International Workshop 2019, Mar. 7, 2019.

Dongguk Lim, IEEE P802.11 Wireless LANs, PDT-PHY-EHT-PPDU-Format-Update, Nov. 18, 2020.

IEEE, IEEE P802.11ax/D6.1 Draft Standard for Information Technology—Telecommunications and information exchange between systems local and metropolitan area networks—specific requirements, Part 11: Wireless LAN Medium Access Control (MAC) and Physical Layer (PHY) Specifications, Amendment 1: Enhancements for High Efficiency WLAN, May 2020.

Mengshi Hu et al., IEEE P802.11 Wireless LANs, Proposed Draft Text: Nominal Packet Padding Values Selection Rules, Mar. 2021.

Mengshi Hu et al., IEEE P802.11 Wireless LANs, Proposed Draft Text: EHT PPE Thresholds field, Mar. 2021.

Hongyuan Zhang et al., IEEE P802.11 Wireless LANs, PPE Threshold Field, Mar. 5, 2018.

* cited by examiner

200A

| NOMINAL PACKET PADDING | ENCODING OPTION 1 |
|---|---|
| 0 | Set to 0 if the nominal packet padding is 0 μs for all constellations, NSS and RU allocations the STA supports. |
| 1 | Set to 1 if the nominal packet padding is 8 μs for all constellations, NSS and RU allocations the STA supports. |
| 2 | Set to 2 if the nominal packet padding is 16 μs for all constellations, NSS and RU allocations the STA supports. |
| 3 | Reserved. |

| NOMINAL PACKET PADDING | ENCODING OPTION 2 |
|---|---|
| 0 | Set to 0 if the nominal packet padding is 0 μs for all constellations, NSS and RU allocations the STA supports. |
| 1 | Set to 1 if the nominal packet padding is 8 μs for all constellations, NSS and RU allocations the STA supports. |
| 2 | Set to 2 if the nominal packet padding is 16 μs for all constellations, NSS and RU allocations the STA supports. |
| 3 | Set to 3 if the nominal packet padding is New Max PE value (e.g., 20 or 24 μs) for all constellations, NSS and RU allocations the STA supports |

| NOMINAL PACKET PADDING | ENCODING OPTION 3 |
|---|---|
| 0 | Set to 0 if the nominal packet padding is 0 μs for all constellations, NSS and RU allocations the STA supports. |
| 1 | Set to 1 if the nominal packet padding is 8 μs for all constellations, NSS and RU allocations the STA supports. |
| 2 | Set to 2 if the nominal packet padding is 16 μs for all constellations, NSS and RU allocations the STA supports. |
| 3 | Set to 3 if the nominal packet padding is 16 μs for all modes with constellations≤1024, NSS≤8 and RU≤996*2, and New Max PE value (e.g., 20 or 24 μs) for all other modes the STA supports. |

| NOMINAL PACKET PADDING | ENCODING OPTION 4 |
|---|---|
| 0 | Set to 0 if the nominal packet padding is 0 μs for all constellations, NSS and RU allocations the STA supports. |
| 1 | Set to 1 if the nominal packet padding is 8 μs for all constellations, NSS and RU allocations the STA supports. |
| 2 | Set to 2 if the nominal packet padding is 16 μs for all modes with constellations≤1024, NSS≤8 and RU≤996*2, and New Max PE value (e.g., 20 or 24 μs) for all other modes the STA supports. |
| 3 | Reserved |

Figure 2D

EHT CAPABILITY DESIGN FOR PPE THRESHOLD

CROSS-REFERENCE TO RELATED APPLICATION AND PRIORITY CLAIM

This application claims the benefit of U.S. Provisional Patent Application No. 63/057,224 entitled "EHT Capability Design for PPE Threshold" filed Jul. 27, 2020, U.S. Provisional Patent Application No. 63/067,904 entitled "EHT PE Calculation and Signaling" filed Aug. 20, 2020, U.S. Provisional Patent Application No. 63/124,175 entitled "EHT PE Calculation and Signaling—followup2" filed Dec. 11, 2020, U.S. Provisional Patent Application No. 63/138,562 entitled "EHT PE Calculation and Signaling—followup4" filed Jan. 18, 2021, and U.S. Provisional Patent Application No. 63/145,169 entitled "EHT PE Calculation and Signaling—followup5" filed Feb. 3, 2021, each of which is incorporated by reference in its entirety as if fully set forth herein.

In addition, the application is related to U.S. patent application Ser. No. 17/319,060 entitled "EHT Padding and Packet Extension Method and Apparatus" filed May 12, 2021, which is incorporated by reference in its entirety as if fully set forth herein.

BACKGROUND

Field

The present disclosure is directed in general to communication networks. In one aspect, the present disclosure relates generally to wireless local area network (WLAN) implementing the Institute of Electrical and Electronics Engineers (IEEE) 802.11 standard and any other standards and/or networks that can provide wireless transfer of data in outdoor deployments, outdoor-to-indoor communications, and device-to-device (P2P) networks.

Description of the Related Art

An ever-increasing number of relatively inexpensive, low power wireless data communication services, networks and devices have been made available over the past number of years, promising near wire speed transmission and reliability. Enabling technology advances in the area of wireless communications, various wireless technology standards (including for example, the IEEE Standards 802.11a/b/g, 802.11n, 802.11ac and 802.11ax and their updates and amendments, as well as the IEEE Standard 802.11be now in the process of being developed) have been introduced that are known to persons skilled in the art and are collectively incorporated by reference as if set forth fully herein fully. For example, recent proposals for the latest 802.11be standard provide higher data rates and improved transmission efficiencies between wireless devices by, inter alia, adding multiple-RU (resource unit) support for client stations and increasing the modulating order, the signaling bandwidth, and the number of spatial streams. However, such additions are not supported by existing encoding schemes, and the existing solutions for providing wireless data communication services with higher data rates and improved transmission efficiencies are extremely difficult at a practical level by virtue of the difficulty in balancing increased data signaling with the overhead, processing, and timings costs required for signaling and processing higher data rates.

BRIEF DESCRIPTION OF THE DRAWINGS

The present invention may be understood, and its numerous objects, features and advantages obtained, when the following detailed description of a preferred embodiment is considered in conjunction with the following drawings.

FIGS. 2A-D are charts illustrating nominal packet padding encoding options for use with signaling packet extension values required by the STA in accordance with selected embodiments of the present disclosure.

DETAILED DESCRIPTION

A system, apparatus, and methodology are described for enabling wireless communication station (STA) devices to compute and signal their packet extension capabilities or requirements for accommodating wider bandwidth and multiple resource unit assignments provided for orthogonal frequency-division multiplexing (OFDM) modulated symbols supported by emerging 802.11 standards, such as 802.11be, which allow up to 320 MHz PPDUs, 16 spatial streams, punctured transmissions and higher modulation levels, such as 4096 quadrature amplitude modulation (QAM). In selected embodiments, the EHT data frames are provided with packet padding extensions to effectively extend the PPDU energy and provide more time for receiver to process the data portion and send feedback frames, such as acknowledge (ACK) or block ACK (BA), thereby accounting for receiver delays in processing higher data rates that are supported by emerging 802.11 standards. To correctly encode the EHT data frames with suitable packet padding extensions for each STA device, every STA device should declare or signal its packet padding capability or requirements for processing longer packet extension values supported by emerging 802.11 standards. The capability signaling can occur during the initial association process by having each STA send a MAC control management frame or packet having an EHT capabilities element that includes either common nominal packet padding field values or PHY packet extension threshold (PPET) field values. In selected embodiments, each STA uses a first packet extension signaling procedure to set a common nominal packet extension value in the EHT capabilities element for all constellations, spatial streams Nss, and resource unit (RU) sizes supported by the STA. In such embodiments, the common nominal packet extension value is selected from a group consisting of one or more first signal values (e.g., 0, 1, 2) corresponding to the 802.11ax EHT nominal packet padding/extension values (e.g., 0 µs, 8 µs, or 16 µs) and a second signal value (e.g., 3) corresponding to a new EHT nominal packet padding/extension value that is greater than 16 µs (e.g., 20 µs or 24 µs) for use with all constellations, Nss and RU allocations the STA supports, or for use with at least the STA-supported new modes with constellation>1024, or Nss>8 or RU/MRU>2*996. In other selected embodiments, each STA uses a second packet extension signaling procedure to declare different nominal packet extension values for specific constellation, Nss, RU/MRU sizes supported by the STA. In such embodiments, the STA signals a plurality of PPE Threshold (PPET) field values to declare a plurality of different packet padding extension values (including at least one longer, 802.11be packet extension value) for use with specific constellation, Nss, RU/MRU sizes.

Figure 1:
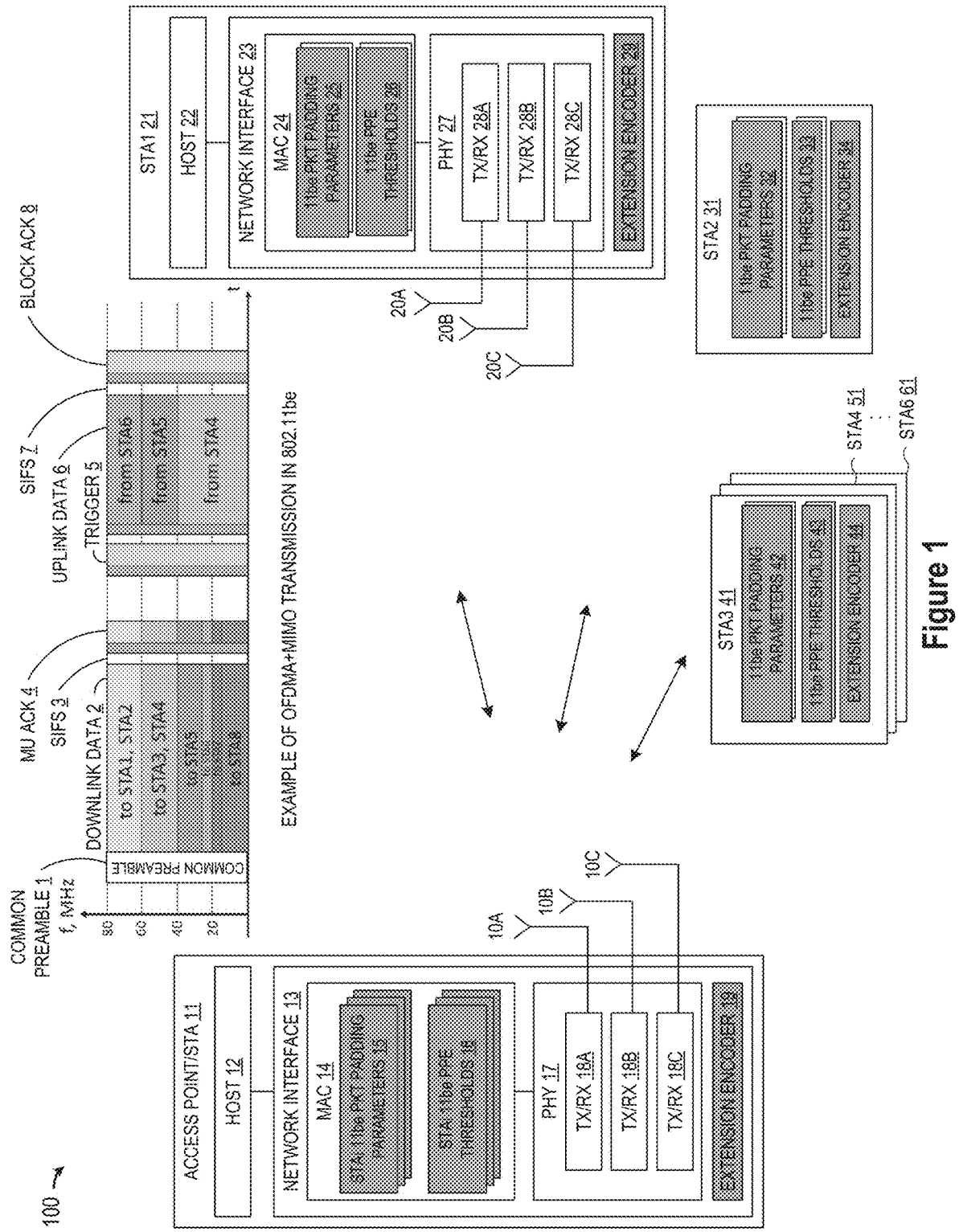
FIG. 1 is a block diagram of a wireless local area network (WLAN) in which wireless communication station (STA) devices signal their 11be padding capabilities with either nominal packet padding or PPET field signaling for use in calculating packet extensions used in EHT PHY data frames in accordance with selected embodiments of the present disclosure.

To provide a contextual understanding for selected embodiments of the present disclosure, reference is now made to FIG. 1 which shows a block diagram of a wireless local area network (WLAN) 100 in which an access point (AP) station (STA) 11 and one or more wireless devices 21, 31, 41, 51, 61 transmit and receive data frames 2, 6. As depicted, the AP 11 includes a host processor 12 coupled to a network interface 13. In selected embodiments, the network interface 13 includes one or more integrated circuits (IC) devices configured to operate a local area network (LAN) protocol. To this end, the network interface 13 may include a medium access control (MAC) processor 14 and a physical layer (PHY) processor 17. In selected embodiments, the MAC processor 14 is implemented as an 802.11be MAC processor 14, and the PHY processor 17 is implemented as an 802.11be PHY processor 17. The PHY processor 17 includes a plurality of transceivers 18 which are coupled to a plurality of antennas 10. Although three transceivers 18A-C and three antennas 10A-C are illustrated, the AP 11 may use any suitable number of transceivers 18 and antennas 10 in other embodiments. In addition, the AP 11 may have more antennas 10 than transceivers 18, in which case antenna switching techniques are used to switch the antennas 10 between the transceivers 18. In selected embodiments, the MAC processor 14 is implemented with one or more integrated circuit (IC) devices, and the PHY processor 17 is implemented on one or more additional IC devices. In other embodiments, at least a portion of the MAC processor 14 and at least a portion of the PHY processor 17 are implemented on a single IC device. In various embodiments, the MAC processor 14 and the PHY processor 17 are configured to operate according to at least a first communication protocol (e.g., 802.11be). In other embodiments, the MAC processor 14 and the PHY processor 17 are also configured to operate according to one or more additional communication protocols (e.g., according to the IEEE 802.11ax Standard). Using the communication protocol(s), the AP device 11 is operative to create a wireless local area network (WLAN) 100 in which one or more client stations (e.g., 21) may communicate with the AP 11 and/or with other client stations (e.g., 31, 41) located within the WLAN 100. Although six client stations 21, 31, 41, 51, 61 are illustrated in FIG. 1, the WLAN 100 may include any suitable number of client stations in various scenarios and embodiments.

At least one of the client stations (e.g., client station 21) is configured to operate at least according to the first communication protocol. To this end, the client station 21 includes a host processor 22 coupled to a network interface 23. In selected embodiments, the network interface 23 includes one or more IC devices configured to operate as discussed below. For example, the depicted network interface 23 may include a MAC processor 24 and a PHY processor 27. In selected embodiments, the MAC processor 24 is implemented as an 802.11be MAC processor 24, and the PHY processor 27 is implemented as an 802.11be PHY processor 27. The PHY processor 27 includes a plurality of transceivers 28 coupled to a plurality of antennas 20. Although three transceivers 28A-C and three antennas 20A-C are illustrated, the client station 21 may include any suitable number of transceivers 28 and antennas 20. In addition, the client station 21 may include more antennas 20 than transceivers 28, in which case antenna switching techniques are used. In selected embodiments, the MAC processor 24 is implemented on at least a first IC device, and the PHY processor 27 is implemented on at least a second IC device. In other embodiment, at least a portion of the MAC processor 24 and at least a portion of the PHY processor 27 are implemented on a single IC device. As will be appreciated, one or both of the client stations 31, 41 may have a structure that is the same as or similar to the client station 21, though there can be structural differences.

As disclosed herein, the wireless access point (AP) station (STA) 11 transmits data streams to one or more client stations 21, 31, 41, 51, 61 in the WLAN 100. The AP 11 is configured to operate with client stations (e.g., 21) according to at least a first communication protocol which may be referred to as "extremely high throughput" or EHT communication protocol or IEEE 802.11be communication protocol. In some embodiments, different client stations in the vicinity of the AP 11 are configured to operate according to one or more other communication protocols which define operation in some of the same frequency band(s) as the EHT communication protocol but with generally lower data throughputs. Such lower data throughput communication protocols (e.g., IEEE 802.11a, IEEE 802.11n, IEEE 802.11ac and/or 802.11ax) are collectively referred herein as "legacy" communication protocols.

In the context of the present disclosure, it will be understood by those skilled in the art that the IEEE 802.11 standard (a.k.a., Wi-Fi) has been amended to provide very high data throughput performance in real-world, high density scenarios. For example, there are advanced Physical Layer techniques being addressed in IEEE 802.11be standard which add more flexibility to the orthogonal frequency-division multiple access (OFDMA) modulation schemes by increasing (i) the order of modulation up to 4K-QAM, (ii) the bandwidth up to 320 MHz and beyond, and (iii) the number of spatial streams in MU-MIMO up to 16. The IEEE 802.11be standard also provides new opportunities for resource allocation by allowing the AP to allocate multiple resource units (RUs) to a client station. Unfortunately, existing 802.11 wireless encoding schemes do not support the new PHY features which provide higher order modulation schemes, wider bandwidth, additional spatial multiplexing streams, and resource unit aggregation by client station. As a result, the data encoding and packet padding must be modified to support the improved data throughput performance with new features and additional services, while at the same time continuing to satisfy all the current use cases requirements and ensure backwards compatibility to existing IEEE 802.11 standards.

The operational challenges for supporting higher data throughput with MIMO transmission sequences performed in the 802.11be standard are illustrated with reference to the 802.11be-compliant AP 11 which uses the same scheduling approach for OFDMA as defined in the 802.11ax standard whereby the AP 11 initiates a downlink multi-user data frame transmission 2 using OFDMA and/or MIMO by first transmitting a common preamble 1 with defined preamble signal information in the designated frequency bands. After a Short Interframe Space (SIFS) 3, the client station(s) process the received downlink data frame 2 and respond with a multi-user ACK (MU ACK) response 4. Conversely, the AP 11 may initiate a trigger-based uplink (UL) MU transmission to receive an uplink MU data frame 6 by first transmitting a trigger message frame 5 with power pre-correction information in the designated frequency bands, in response to which the client station(s) transmit uplink data frames 6 and respond with a multi-user ACK (MU ACK) response. After a Short Interframe Space (SIFS) 7, the AP responds with a single "Block Ack" (BA) acknowledgment frame 8. As indicated with the relatively short duration of the SIFS 3, the receiver client stations (e.g., 21) have a limited and fixed amount of time to process the OFDMA symbols in a transmitted downlink data frame 2, and with increased data throughput enabled by the 802.11be standard, the processing time required at the receiver/client station to process the PPDU preamble and data effectively increases, and consequently the response time for the receiver/client station to send an ACK frame 4 to the AP 11 shrinks. The same is true in the reverse direction where the short duration of the SIFS 7 provides the AP station (e.g., 11) with only a limited and fixed amount of time to process the OFDMA symbols in a transmitted uplink data frame 6 before sending a block ACK frame 8 to the client station.

One solution to this problem provided in earlier protocols, such as the 802.11ax standard, is to provide some "extra" processing time by appending a packet extension (PE) signal to the end of the PPDU, where the duration of the additional PE signal is computed as a function of a pre-FEC padding a-factor and a receiving station's PE capability. Unfortunately, the maximum nominal packet padding defined for the 802.11ax standard is 16 μs, thereby preventing the use of additional PE duration to account for enhancements with the 802.11be signaling scheme which increases the order of modulation up to 4K-QAM, extends the bandwidth up to 320 MHz, and expands the maximum spatial streams to 16. Another drawback with the encoding scheme for the 802.11ax standard is that there is no mechanism for signaling the PHY packet extension capabilities, including the new, longer packet extension values, for all new possible [Nss RU] combinations supported by the new 802.11be standard.

To address one or more shortcomings of the existing 802.11 standards, the AP 11 and each client station (e.g., 21, 31, 41) is able to accommodate wider bandwidth, more number of streams, higher modulation order, and aggregated resource unit assignments by including an EHT extension encoder engine 19, 29, 34, 44 which is configured to add one or more longer packet extension signals after the last symbol of the EHT data field prior to transmission. And in order for the different STA devices to communicate with a shared understanding of which packet extension signals are being used, the EHT extension encoder engine 19, 29, 34, 44 at each STA must signal its supported PHY packet extension capabilities for all new possible [Nss RU] combinations to support the new longer packet extension signal values.

While the existing 802.11ax standard which uses two different capability signaling mechanisms, neither provides a mechanism for signaling all new possible [Ns combinations and new longer packet extension signal values. In particular, the first 802.11ax capability signaling mechanism specifies three nominal packet padding values (0-2) to indicate one common packet extension value for all 802.11ax bandwidth and Nss combinations, where the longest or maximum common packet extension value is 16 μs. For example and as illustrated with the example chart 200A depicted in FIG. 2A, the 802.11ax nominal packet padding parameters may set the common nominal packet padding field values to a first value (e.g., "0") if the STAi has a first maximum nominal packet extension capability value (e.g., 0 μs), to a second value (e.g., "1") if the STAi has a second, larger maximum nominal packet extension capability value (e.g., 8 μs), and to a third value (e.g., "2") if the STAi has a third, larger maximum nominal packet extension capability value (e.g., 16 μs), where the fourth value (e.g., "3") is reserved and not used to signal any nominal packet extension value. In the second 802.11ax capability signaling mechanism, each STA may specify two PPE threshold values (PPET8 and PPT16) to indicate specific MCS thresholds for specific 802.11ax bandwidth and Nss combinations, but the longest or maximum common packet extension value under this approach is 16 μs.

To address these and other shortcomings of the existing 802.11ax PE capability signaling capabilities, the AP 11 and each client station (e.g., 21, 31, 41, 51, 61) include a capability signaling mechanism which implements as a non-obvious extension or modification of the 802.11ax standard. To this end, the EHT extension encoder engine 19, 29, 34, 44 in each STA (e.g., 11, 21, 31, 41) may include an EHT packet extension signaling capability for generating a MAC control packet which signals either a set of common nominal packet padding field values (e.g., 15, 25, 32, 42) or a set of PHY packet extension threshold (PPET) field values (e.g., 16, 26, 33, 43). As will be appreciated, the capability signaling is performed in both directions so that each client station (e.g., 21) includes nominal packet padding parameters 25 which are signaled by the AP 11, if not also the other stations.

In selected embodiments in which common nominal packet padding field values 15 are used to signal PE capabilities, the AP 11 may be configured to receive and store a set of 802.11be nominal packet padding parameters 15 which are signaled by each station (e.g., 11, 21, 31, 41, 51, 61). For example and as illustrated with the example chart 200B depicted in FIG. 2B, the 802.11be nominal packet padding parameters 15 for station STAi may be received at the AP 11 as a MAC control packet where a first encoding option sets the common nominal packet padding field values to a first value (e.g., "0") if the STAi has a first maximum nominal packet extension capability value (e.g., 0 μs), to a second value (e.g., "1") if the STAi has a second, larger maximum nominal packet extension capability value (e.g., 8 μs), to a third value (e.g., "2") if the STAi has a third, larger maximum nominal packet extension capability value (e.g., 16 μs), and to a fourth value (e.g., "3") if the STAi has a fourth, larger maximum nominal packet extension capability value (e.g., 20 μs or 24 μs).

Alternatively, the AP 11 may be configured to receive and store a set of 802.11be nominal packet padding parameters 15 which are signaled by each station (e.g., 11, 21, 31, 41, 51, 61) with a second encoding option illustrated with the example chart 200C depicted in FIG. 2C. In this example, the second encoding option is used to signal PE capabilities by setting the common nominal packet padding field value 15 to the first value (e.g., "0") if the STAi has a first maximum nominal packet extension capability value (e.g., 0 μs), to the second value (e.g., "1") if the STAi has a second, larger maximum nominal packet extension capability value (e.g., 8 μs), to the third value (e.g., "2") if the STAi has a third, larger maximum nominal packet extension capability value (e.g., 16 μs), and to the fourth value (e.g., "3") to signal that the STAi will use the third, larger maximum nominal packet extension value (e.g., 16 μs) for all modes with constellations≤1024, or Nss≤8, or RU≤996*2, but will use a fourth, larger maximum nominal packet extension value (e.g., 20 μs or 24 μs) for all other modes the STAi supports.

Alternatively, the AP 11 may be configured to receive and store a set of 802.11be nominal packet padding parameters 15 which are signaled by each station (e.g., 11, 21, 31, 41, 51, 61) with a third encoding option illustrated with the example chart 200D depicted in FIG. 2D. In this example, the third encoding option is used to signal PE capabilities by setting the common nominal packet padding field value 15 to a first value (e.g., "0") if the STAi has a first maximum nominal packet extension capability value (e.g., 0 μs), to the second value (e.g., "1") if the STAi has a second, larger maximum nominal packet extension capability value (e.g., 8 μs), and to the third value (e.g., "2") to signal that the STAi will use the third, larger maximum nominal packet extension value (e.g., 16 μs) for all modes with constellations≤1024, or Nss≤8, or RU≤996*2, but will use a fourth, larger maximum nominal packet extension value (e.g., 20 μs or 24 μs) for all other modes the STAi supports. Under the third encoding option, the fourth value (e.g., "3") is reserved.

As an alternative to using the common nominal packet padding field values, each STA device (e.g., 11, 21, 31, 41, 51, 61) can use PPE Threshold (PPET) field values to declare different packet padding extension values (including at least one longer, 802.11be packet extension value) for specific constellation, Nss, RU combination sub-groupings. To this end, the following 802.11ax constellation index table is modified to replace or redefine the reserved value ("6") to indicate the new 4096-QAM transmission constellation that is supported by the 802.11be standard. The resulting 802.11be constellation index table is shown below:

TABLE 1

| 802.11be Constellation Index | |
|---|---|
| Constellation Index | Corresponding Transmission Constellation |
| 0 | BPSK |
| 1 | QPSK |
| 2 | 16-QAM |
| 3 | 64-QAM |
| 4 | 256-QAM |
| 5 | 1024-QAM |
| 6 | 4096-QAM |
| 7 | None |

With the modified constellation index table, the AP 11 may use a second packet extension signaling procedure which sets different nominal packet extension values (e.g., 8, 16, and 20 μs) for different sub-groupings of constellations, Nss, and RU sizes. To this end, the AP may be configured to receive and store a set of 802.11be PPE thresholds 16 which are signaled by each station (e.g., 21, 31, 41, 51, 61) with a MAC control packet which includes a 4-bit Nss field (for identifying up to 16 spatial streams Nss), an N-bit RU Index Bitmask field (for identifying specified RU sizes, and a PPE Thresholds Info field to specify a plurality of different packet padding extension values (including at least one longer, 802.11be packet extension value) for use with specific constellation, Nss, RU combination sub-groupings. In one example, the N-bit RU Index Bitmask uses 5 bits indicating RU sizes of [242, 484, 996, 996*2, 996*4]. In another example, the N-bit RU Index Bitmask uses 6 bits indicating RU sizes of [242, 484, 996, 996*2, 996*3, 996*4].

In a first encoding option, the PPE Thresholds Info field may include three information fields (PPET8, PPET16, PPET_NEW) which specify constellation index threshold values for different Nss/RU combinations. In this case, the AP 11 calculates the nominal packet padding for a receiving STA as follows. If the constellation index for the transmission data is greater than or equal to the PPET_NEW value set by the receiving STA, then the AP 11 should choose the new nominal packet extension value (e.g., 20 μs or 24 μs). However, if the constellation index for the transmission data is greater than or equal to PPET_16 and smaller than PPET_NEW, then the AP 11 should choose the next longer nominal packet extension value (e.g., 16 μs). And if the constellation index for the transmission data is greater than or equal to PPET_8 and smaller than PPET_16, then the AP 11 should choose the next longer nominal packet extension value (e.g., 8 μs). Otherwise, the nominal packet extension value of 0 is chosen. In this example, the receiving STA can independent set the information field values PPET8, PPET16, PPET_NEW.

In a second encoding option, the PPE Thresholds Info field may include two information fields (PPET1 and PPET2) for each Nss/RU combination indicating the constellation thresholds for three nominal PE values, PE1, PE2, PE3 which can be set independently by the receiving STA. Example nominal PE values include Example 1: [0 12 20], Example 2: [4 12 20], Example 3: [8 16 20], and Example 4: [0 8 20]. With the second encoding option, a receiving STA specifies, for each [Nss RU] combination, two information field values PPET1, PPET2 based on a choice of the three PE capability values PE1, PE2, PE3. To signal 802.11ax capabilities, the PPE Thresholds Info field values PPET1 and PPET2 are set to PE1=PPET8 and PE2=PPET16 so that, if the constellation is greater than or equal to PE2=PPET16, the value of the maximum PPET16 parameter is applied, or if the constellation is greater than or equal to PE1=PPET8, then the value of the maximum PPET8 parameter is applied, otherwise, no packet extension is applied. However, to signal one of the new 802.11be capabilities, the PPE Thresholds Info field values PPET1 and PPET2 may be set to PE1=PPET8 and PE2=PPET_NEW so that, if the constellation is greater than or equal to PE2=PPET_NEW, the value of the maximum PPET_NEW parameter is applied, or if the constellation is greater than or equal to PE1=PPET8, then the value of the maximum PPET8 parameter is applied, otherwise, there is no packet extension.

In selected embodiments of the second encoding option, the PPE Thresholds Info field may include two information fields (e.g., PPET8 and PPET16) which are used to signal the constellation threshold of each nominal packet extension value for each Nss/RU combination and which can be set independently by the receiving STA. If the QAM constellation index for the transmission data is (1) greater than or equal to the PPET8 value set by the receiving STA and (2) is either (a) less than the PPETx value or (b) set to "none" value, then the required minimum nominal packet extension value is 8 μs. But the required minimum nominal packet extension value is 16 μs if (1) the QAM constellation index for the transmission data is either (a) greater than or equal to the PPET8 value set by the receiving STA or (b) the PPET8 value is set to "none" constellation index value, and (2) the QAM constellation index value is (a) greater than or equal to the PPET16 value and (b) less than the constellation index value for 4096-QAM. Finally the required minimum nominal packet extension value is 20 μs (or 24 μs) if (1) the QAM constellation index for the transmission data is either (a) greater than or equal to the PPET8 value set by the receiving STA or (b) the PPET8 value is set to "none" constellation index value, and (2) the QAM constellation index value is (a) greater than or equal to the PPET16 value and (b) equal to the constellation index value for 4096-QAM. Otherwise, 0 μs minimum nominal packet extension is indicated. Stated with equational pseudo logic, the meaning of the two information fields (PPET8 and PPET16) is:

If QAM≥PPET8 && (QAM<PPET16||PPET16==7), the required minimum PE value is 8 μs,
else If (QAM≥PPET8||PPET8==7) && (QAM≥PPET16 && QAM<6)), the required minPE value is 16 μs,
else If (QAM≥PPET8||PPET8==7) && (QAM≥PPET16 && QAM==6), the required minimum PE value is 20 μs,
else, the required minimum PE value is 0 μs.

In a third encoding option, the PPE Thresholds field may include three information fields (PPET1$_{PHY\_RATE}$, PPET2$_{PHY\_RATE}$ and PPET3$_{PHY\_RATE}$) regardless of supported maximum Nss and RU/MRU size. With the third encoding option, a receiving STA specifies each of the information fields PPET1$_{PHY\_RATE}$, PPET2$_{PHY\_RATE}$ and PPET3$_{PHY\_RATE}$ as an n-bit value indicating the corresponding threshold of PHY data rate (PHY_Rate) corresponding to each nominal packet extension value. In this case, the AP 11 determines the nominal packet padding for a receiving STA by calculating the PHY Rate for the transmission data. If the calculated PHY_Rate for the transmission data is less than the first PPET1$_{PHY\_RATE}$ value set by the receiving STA, then the AP 11 should use nominal packet extension value of 0 μs. However, if the calculated PHY_Rate for the transmission data is greater than or equal to the first PPET1$_{PHY\_RATE}$ value and smaller than the second PPET2$_{PHY\_RATE}$ value, then the AP 11 should apply the next longer packet extension value (e.g., 8 μs). And if the calculated PHY_Rate for the transmission data is greater than or equal to the second PPET2$_{PHY\_RATE}$ value and smaller than the third PPET3$_{PHY\_RATE}$ value, then the AP 11 should apply the next longer packet extension value (e.g., 16 μs). Otherwise, the the AP 11 should apply the maximum packet extension value (e.g., 20 μs or 24 μs). Stated with equational pseudo logic, the meaning of the three information fields (PPET1$_{PHY\_RATE}$, PPET2$_{PHY\_RATE}$ and PPET3$_{PHY\_RATE}$) is:

If PHY_Rate<PPET1$_{PHY\_RATE}$, the nominal packet extension of 0 us is needed,
else If PPET1$_{PHY\_RATE}$≤PHY_Rate<PPET2$_{PHY\_RATE}$, the nominal packet extension of 8us is needed,
else If PPET2$_{PHY\_RATE}$≤PHY_Rate<PPET3$_{PHY\_RATE}$, the nominal packet extension of 16 μs is needed,
else If the nominal packet extension of 20 us is needed.

With access to the packet padding parameters 15, 25, 32, 42 or PPE thresholds 16, 26, 33, 43, the EHT padding encoder engine 19, 29, 34, 44 at each station (e.g., 11, 21, 31, 41) is configured to implement a two-step FEC padding computation for generating pre-FEC padding bits and post-FEC padding bits, and to add a packet extension signal after the last symbol of the EHT data field prior to transmission. Each EHT padding encoder engine 19, 29, 34, 44 employs predetermined padding rules to compute a pre-FEC padding a-factor, and then uses the pre-FEC padding a-factor to compute pre-FEC padding values for new resource unit (RU) sizes which are provided in the 802.11be data frame encoding scheme. Once the pre-FEC padding values are computed, the EHT padding encoder engine 19, 29, 34, 44 attaches them to the excess information bits N$_{EXCESS}$ to fill up to the computed pre-FEC padding a-factor in the last symbol of the EHT data field prior to being FEC encoded to generate FEC output bits. Each EHT padding encoder engine 19, 29, 34, 44 is also configured to compute post-FEC padding values which are attached to the FEC output bits in the last symbol of the EHT data field.

In various embodiments, the PHY processing units (e.g., 17, 27) of the AP or client stations (e.g., 11, 21) are each configured to generate data units conforming to the first communication protocol and having formats described herein. In addition, the transceiver(s) (e.g., 18, 28) is/are configured to transmit the generated data units via the antenna(s) 10, 20. Similarly, each transceiver (e.g., 18, 28) may be configured to receive data units via the antenna(s) 10, 20, and each PHY processing unit (e.g., 17, 27) is configured to process received data units conforming to the first communication protocol and having formats described herein and to determine that such data units conform to the first communication protocol.

Figure 3:
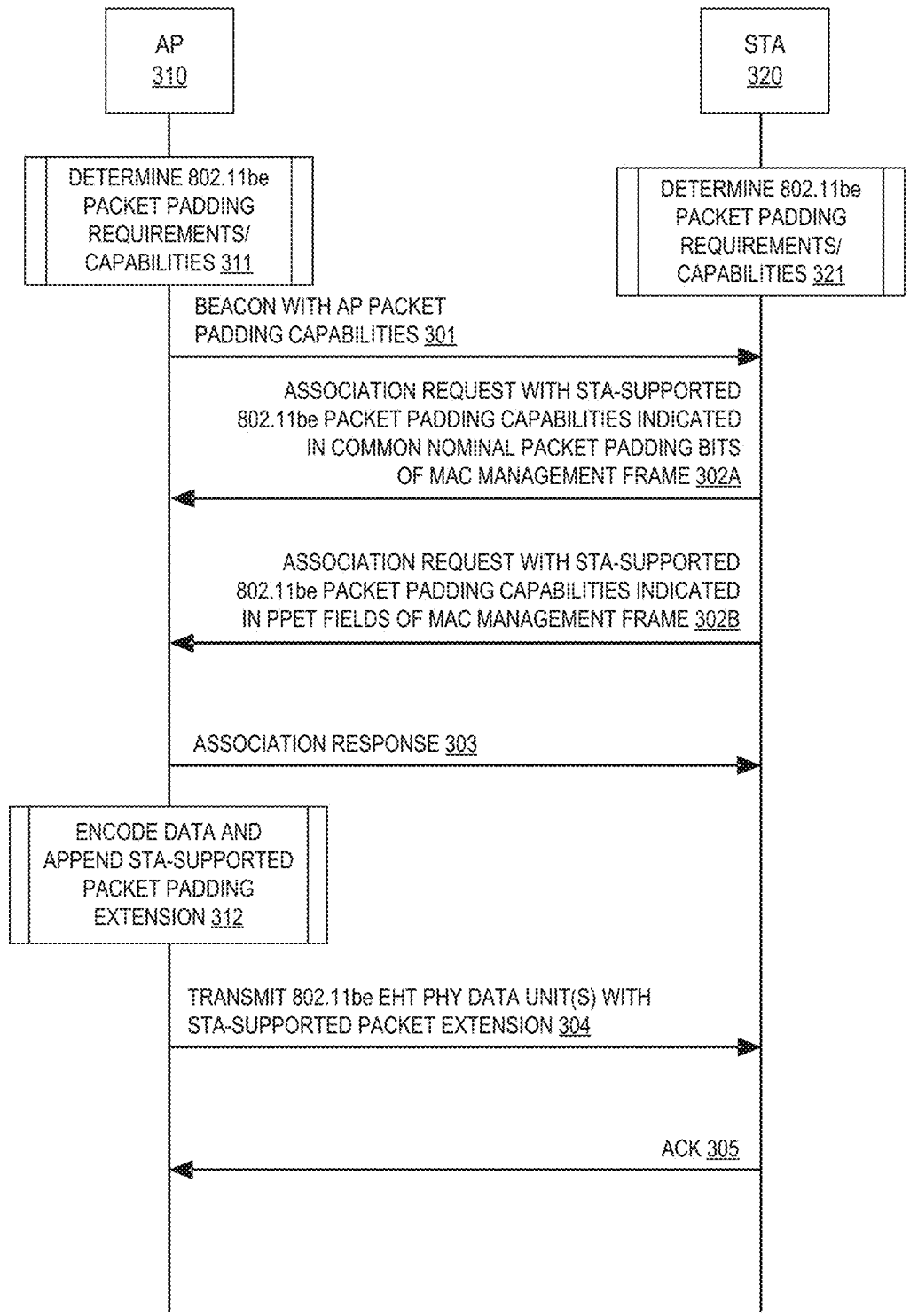
FIG. 3 is a diagrammatic illustration of the messages exchanged between an access point (AP) and STA when signaling STA-supported padding capabilities with either nominal packet padding or PPET field signaling for use in calculating packet extensions used in EHT PHY data frames in accordance with selected embodiments of the present disclosure.

As disclosed herein, each station (STA) computes and signals its packet extension capabilities or requirements for accommodating EHT data frames with larger bandwidth and multiple resource unit assignments provided by the new 802.11be standard. To provide an illustrative example of how the capability signaling can occur, reference is now made to FIG. 3 which is a diagrammatic illustration of a wireless communication system 300 wherein an access point (AP) 310 and receiving station or STA 320 exchange messages to signal the STA-supported padding capabilities with either nominal packet padding or PPET field signaling for use in calculating packet extensions used in EHT PHY data frames in accordance with selected embodiments of the present disclosure.

As a preliminary matter, the AP 310 and receiving STA 320 each determine their respective 802.11be packet padding requirements at the computational steps 311, 321. In each case, the packet padding requirements are computed or programmed based on the determination of the amount of additional processing time required by the AP 310 or STA 320 to process the additional bandwidth, signal streams, and multiple RU assignments enabled by the 802.11be standard. As will be appreciated, the computations processing at step 311, 321 can occur at any time, and need not occur simultaneously.

With the packet padding requirements known a priori to the AP 310 and STA 320, the capability signaling can occur during the initial association process. For example, the AP may transmit a beacon message 301 which signals the AP packet padding capabilities to the STA 320. In response, the STA may transmit an association request message 302 as part of a MAC control management frame or packet. In selected embodiments, the association request message 302A identifies the STA-supported 802.11be packet padding capabilities by using common nominal packet padding bits or field values to specify a single packet extension value to be used for all bandwidth and Nss assignments. In other embodiments, the association request message 302B identifies the STA-supported 802.11be packet padding capabilities by using PHY packet extension threshold (PPET) field values to specify specific packet extension values to be used for specific bandwidth and Nss combinations.

In response to the association request message 302, the AP transmits an association response message 303 which acknowledges to the STA 320 that the packet padding capability signal has been received and processed.

As a subsequent point in time, the AP 310 may generate an EHT PHY data unit by encoding data and appending a STA-supported packet padding extension at step 312. At this point, the AP 310 is able to append the correct amount of packet padding to meet the requirements and capability of the receiving station 320 by virtue of having previously received and processed the packet padding capability information in the association request message 302.

Properly encoded with the required amount of packet padding values, the AP may then transmit the 802.11be EHT PHY data unit at step 304. As a result of appending the packet padding values in the EHT PHY data unit message 304, the STA is able to process the message and generate a timely acknowledgement response (e.g., ACK or Block ACK) to acknowledge successful (or unsuccessful) receipt of the EHT PHY data unit within the time period specified for short interframe space (SIFS) responses.

In the present disclosure, the AP 11 depicted in FIG. 1 is an EHT AP, and each of the stations STA1-STAn are ETH STAs. In some implementations, each of the stations STA1-STAn may indicate that it is an EHT STA by transmitting an EHT Capabilities Information field or element to one or more other devices. In selected embodiments, the EHT Capabilities element is included in a MAC control management frame or packet and includes a number of fields used to advertise the EHT capabilities of an EHT STA, including but limited to a common nominal packet padding field, a PPET Thresholds field, and one or more PPET Thresholds Present bits to indicate whether PPE thresholds are present.

Figure 4A:
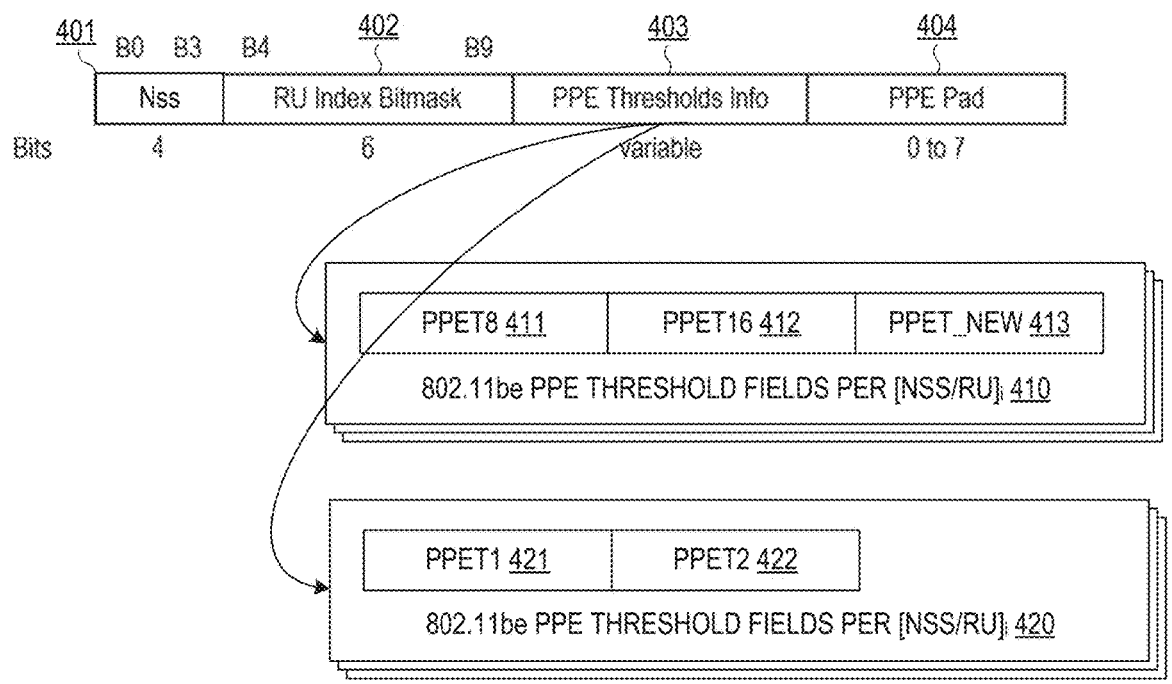
FIG. 4A is a diagrammatic illustration of PPE Thresholds field with different formatting options for using a plurality of elements for each Nss/RU grouping to signal packet extension values supported by the STA in accordance with selected embodiments of the present disclosure.

To provide additional details for an improved understanding of selected embodiments of the present disclosure, reference is now made to FIG. 4A which is a diagrammatic illustration 400A of a PPE Thresholds field 401-404 with different formatting options 410, 420 for using a plurality of elements (e.g., 411-413, 421-422) for an EHT PPDU of a particular RU allocation size and Nss value to signal packet extension values supported by the STA. The format of the PPE Thresholds field 401-404 includes an Nss subfield 401 which contains four bits (B0-B3) which identify the number of streams Nss (up to 16) for which PPE Threshold values are included in the PPE Thresholds Info subfield 403. The depicted RU Index Bitmask subfield 402 contains an N=6 bit bitmask (B4-B9) that indicates whether the PPE Thresholds Info field 403 contains PPE Threshold values for six possible RU allocation indices [242 484 996 996*2 996*3 996*4]. The PPE Threshold values for RU allocation index k are present in the PPE Thresholds Info subfield 403 only if bit k of the RU Index Bitmask subfield 402 (bit 4+k of the EHT PPE Thresholds field) is 1. For example, if B0 of the RU Index Bitmask subfield 402 (B4 of the EHT PPE Thresholds field 400A) is 1, then PPE Threshold values are present in the PPE Thresholds Info field 403 for the RU allocation size corresponding to RU allocation index 0 (242-tone RU). If B0 of the RU Index Bitmask subfield 402 is 0, then PPE Threshold values are not present in the PPE Thresholds Info field 4094 for the RU allocation size corresponding to RU allocation index 0. The PPE Thresholds Info subfield 403 contains a variable number of bits required to convey the plurality of PPET elements for each Nss and RU combination. Finally, the PPE Pad subfield 404 contains all 0s, with the number of bits in the PPE Pad field 404 being the least number of bits required to round the length of the PPE Thresholds Info field to an integer number of octets.

As disclosed herein, the existence of the PPE Thresholds field 401-404 is indicated by a PPE Thresholds Present subfield in the EHT Capabilities Information field. In the 802.11ax PPET field format protocol, there is one capability bit "PPE Thresholds Present" to indicate whether the PPET element exists. Since most PHY modes in the 802.11be standard are similar to the PHY modes in the 8020.11ax standard and can have the same PE requirements, it would be advantageous to omit the PPET elements if the requirement is the same. One option for accomplishing this is to provide an EHT "PPE Thresholds Present" field with a two-bit value. In such embodiments, the 2-bit "PPE Thresholds Present" field has a first value (e.g., 00) to indicate that the PPET elements are not present for 802.11be transmission modes so that normal Packet Padding is indicated. In addition, the 2-bit "PPE Thresholds Present" field has a second value (e.g., 01) to indicate that the PPET elements are omitted for 802.11be transmission modes so that the 802.11axe PPET used. In addition, the 2-bit "PPE Thresholds Present" field has a third value (e.g., 10) to indicate that the PPET elements exist for 802.11be transmission modes. Finally, the 2-bit "PPE Thresholds Present" field has a fourth value (e.g., 11) to indicate a reserved value.

Another option is to add a 1-bit EHT "PPE Thresholds Present" field, in addition to the 802.11ax defined "PPE Thresholds Present" bit. In such embodiments, the additional bit has a first value (e.g., 1) to indicate that EHT PPET elements exists. The additional bit has a second value (e.g., 0) which indicates, if the 802.11ax "PPE Thresholds Present"=0, that both HE and EHT PPET elements are not present and Common nominal packet padding exists. However, if the 802.11ax "PPE Thresholds Present"=1, the second value for the additional bit indicates that EHT PPET elements are omitted for the EHT modes that are defined in the 802.11ax standard and the EHT modes require the same packet extension thresholds as indicated in the 802.11ax PPET capability fields. In the case where the EHT PPET elements are omitted, 802.11be data transmissions for Nss values greater than the maximum 802.11ax Nsts value or for RU/MRU values greater than the maximum 802.11ax RU value will use one nominal packet extension value. In one embodiment, the value is the same as packet extension (PE)

values for the maximum 802.11ax Nsts transmission case (e.g., 8), and the same PPET values for the maximum 802.11ax RU transmission case (e.g., 996*2).

In selected embodiments where the STA uses the PPE Thresholds field 401-404 having an 802.11be PPE threshold field format 410 to signal its packet padding requirements, the PPE Thresholds Info subfield 403 may include three PPET elements (e.g., 411-413). In such embodiments, the PPE Thresholds Info subfield 403 contains n×(Nss+1) bits for every bit in the RU Index Bitmask subfield 402 that is nonzero, where n is the number of bits required for three PPET elements 411-413, and where Nss is the value in the Nss subfield 401. By specifying the different threshold values PPET8 411, PPET16 412, and PPET_NEW 413 in the PPE Thresholds Information field 410, each receiving station STA can signal the nominal packet extension values (e.g., 8, 16, and 20 μs) required for receiving data frames transmission using different constellation, Nss, and RU combination sub-groupings. In particular, the threshold values PPET8 411, PPET16 412, and PPET_NEW 413 in the expanded PPET field 410 may be used by the AP, for each Nss and RU allocation, to choose a first nominal packet extension value (e.g., 8 μs) for a first group of constellations having QAM values between PPET8≤QAM<PPET16. In addition, a second nominal packet extension value (e.g., 16 μs) is chosen for a second group of constellations having QAM values between PPET16≤QAM<PPET_NEW. In addition, a third nominal packet extension value (e.g., 20 μs) is chosen for a third group of constellations having QAM values between PPET≤NEW≤QAM. Finally, a fourth nominal packet extension value (e.g., 0 μs) is chosen for a fourth group of constellations having QAM values QAM<PPET8. In selected embodiments, each of the three different threshold values (e.g., PPET8, PPET16, and PPET_NEW) can be set independently to any desired value, and are not necessarily confined to the threshold values specified in the 802.11ax PPET field format protocol.

In other embodiments where the STA uses the PPE Thresholds field 401-404 having an 802.11be PPE threshold field format 420 to signal its packet padding requirements, the PPE Thresholds Info subfield 403 may include two PPET elements (e.g., 421-422). In such embodiments, the PPE Thresholds Info subfield 403 contains m×(Nss+1) bits for every bit in the RU Index Bitmask subfield 402 that is nonzero, where m is the number of bits required for two PPET elements 421-422, and where Nss is the value in the Nss subfield 401. By specifying the different threshold values PPET1 421 and PPET2 422 in the PPE Thresholds Information field 420, each receiving station STA can signal the nominal packet extension values (e.g., 8, 16, and 20 μs) required for receiving data frames transmission using different constellation, Nss, and RU combination sub-groupings. In particular, the threshold values PPET2 421, PPET2 422 in the expanded PPET field 420 may be used by the AP, for each Nss and RU allocation, to choose a first nominal packet extension value (e.g., 8 μs) for a first group of constellations having QAM values QAM≥PPET8 && (QAM<PPET16||PPET16==7). In addition, a second nominal packet extension value (e.g., 16 μs) is chosen for a second group of constellations having QAM values QAM≥PPET8||PPET8-7) && (QAM≥PPET16 && QAM<6). In addition, a third nominal packet extension value (e.g., 20 μs) is chosen for a third group of constellations having QAM values QAM≥PPET8||PPET8==7) && (QAM≥PPET16 && QAM==6. Finally, a fourth nominal packet extension value (e.g., 0 μs) is chosen for all remaining groups of constellations.

Figure 4B:
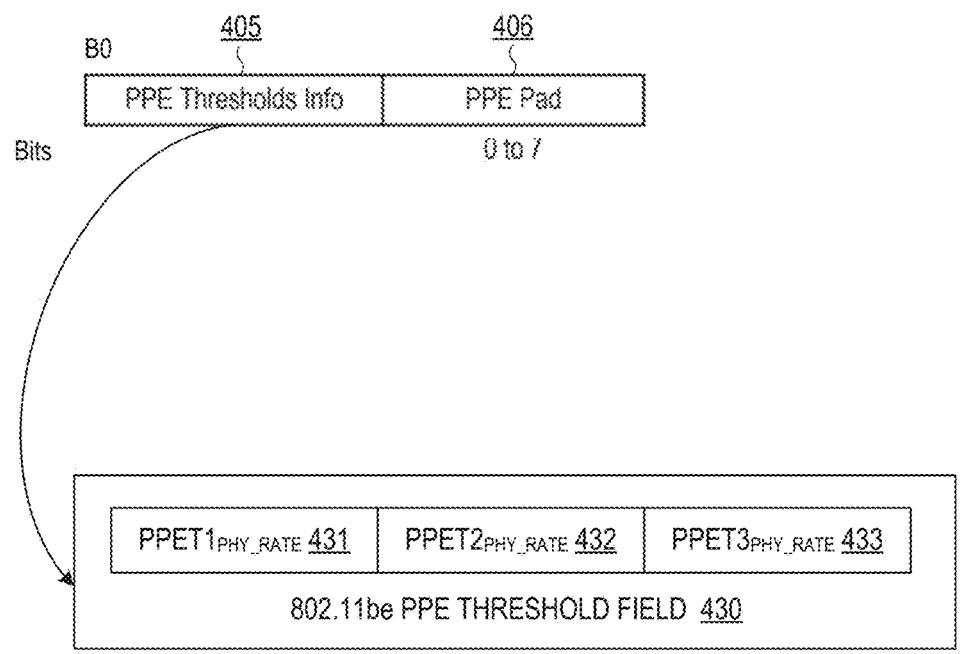
FIG. 4B is a diagrammatic illustration of a PPE Thresholds field having a threshold fields format with a plurality of PHY-rate elements to signal packet extension values supported by the STA in accordance with selected embodiments of the present disclosure.

To provide additional details for an improved understanding of additional selected embodiments of the present disclosure, reference is now made to FIG. 4B which is a diagrammatic illustration 400B of a PPE Thresholds field 405-406 having a threshold fields format 430 for using a plurality of PHY-rate elements (e.g., 431-433) for an EHT PPDU of a particular RU allocation size and NSS value to signal packet extension values supported by the STA. The format of the PPE Thresholds field 405-406 does not include an Nss subfield or RU Index Bitmask subfield, thereby reducing the overhead for the MAC control management frame or packet used to signal the EHT capabilities element. However, the PPE Thresholds field 405-406 contains a specified number of bits in the PPE Thresholds Info field 405 which convey the plurality of PHY-rate elements. In addition, the PPE Pad subfield 406 contains all 0s, with the number of bits in the PPE Pad field 406 being the least number of bits required to round the length of the PPE Thresholds Info field to an integer number of octets.

In selected embodiments where the STA uses the PPE Thresholds field 405-406 having an 802.11be PPE threshold field format 430 to signal its packet padding requirements, the PPE Thresholds Info subfield 405 may include three PHY-rate threshold elements $PPET1_{PHY\_RATE}$ 431, $PPET2_{PHY\_RATE}$ 432, and $PPET3_{PHY\_RATE}$ 433 which the AP uses to determine the length of the packet padding extension for transmitting data to the STA. In such embodiments, the PPE Thresholds Info subfield 405 contains 3×n bits to represent the three PHY-rate threshold elements, where n is the number of bits required to indicate each of the corresponding PHY rate values $PPET1_{PHY\_RATE}$ 431, $PPET2_{PHY\_RATE}$ 432, and $PPET3_{PHY\_RATE}$ 433. As will be appreciated, the number of bits n required to specify a PHY rate value will be longer than the number of bits required to specify a QAM value from the 802.11be Constellation Index, but the overall overhead is reduced since only one set of PHY-rate threshold elements is transmitted by the STA to cover all constellation, Nss, and RU combinations.

By specifying the different threshold values $PPET1_{PHY\_RATE}$ 431, $PPET2_{PHY\_RATE}$ 432 and $PPET3_{PHY\_RATE}$ 433 in the PPE Thresholds Information field 430, each receiving station STA can indicate the nominal packet extension values (e.g., 8, 16, and 20 μs) required for receiving data frames transmission based on the PHY_Rate for data transmission. In particular, the PHY-rate threshold elements $PPET1_{PHY\_RATE}$ 431, $PPET2_{PHY\_RATE}$ 432, and $PPET3_{PHY\_RATE}$ 433 in the expanded PPET field 430 may be used by the AP to choose a first nominal packet extension value (e.g., 0 μs) if the computed PHY_Rate<$PPET1_{PHY\_RATE}$. In addition, a second nominal packet extension value (e.g., 8 μs) is chosen if $PPET1_{PHY\_RATE}$≤PHY_Rate<$PPET2_{PHY\_RATE}$. In addition, a third nominal packet extension value (e.g., 16 μs) is chosen if $PPET2_{PHY\_RATE}$≤PHY_Rate<$PPET3_{PHY\_RATE}$. Alternatively, the third nominal packet extension value (e.g., 16 μs) may be chosen only for 802.11ax transmissions by meeting both requirements that (1) $PPET2_{PHY\_RATE}$≤PHY_Rate<$PPET3_{PHY\_RATE}$ and (2) RU≤996*2 && Nss≤8 && QAM≤1024. Finally, a fourth nominal packet extension value (e.g., 20 μs) is chosen if PHY_Rate≥$PPET3_{PHY\_RATE}$.

As disclosed herein, there are a variety of acceptable ways to compute the PHY_Rate, For example, the AP may compute the true PHY rate in the units of Mbps, though this computation will require larger values of R to identify the true PHY rate. Alternatively, the AP may compute a PHY rate having reduced resolution to reduce the value of R. For example, the AP may compute the PHY_Rate=Nss*RU/242*m, where m is the number of constellation bits. Alternatively, the AP may compute a reduced resolution PHY_Rate=Nss*RU/996*m/2. In another example, the AP may use log resolution computations to compute PHY_Rate=log(Nss*RU/996*m/2) or log(Nss*RU/242*m). In addition, the AP may compute PHY_Rate=log_Nss+log_RU+log_m. In such embodiments, the values of log_Nss, log_RU, and log_m can be obtained with the following example table mappings:

| Nss | log_Nss | RU | log_RU | m | log_m |
|---|---|---|---|---|---|
| 1 | 0 | 20 | 0 | 1 | 0 |
| 2 | 1 | 40 | 1 | 2 | 1 |
| 3~4 | 2 | 80 | 2 | 4 | 2 |
| 5~6 | 3 | 160 | 4 | 6 | 3 |
| 7~8 | 4 | 320 | 5 | 8 | 4 |
| 9~16 | 5 | | | 10 | 5 |
| | | | | 12 | 6 |

Figure 5:
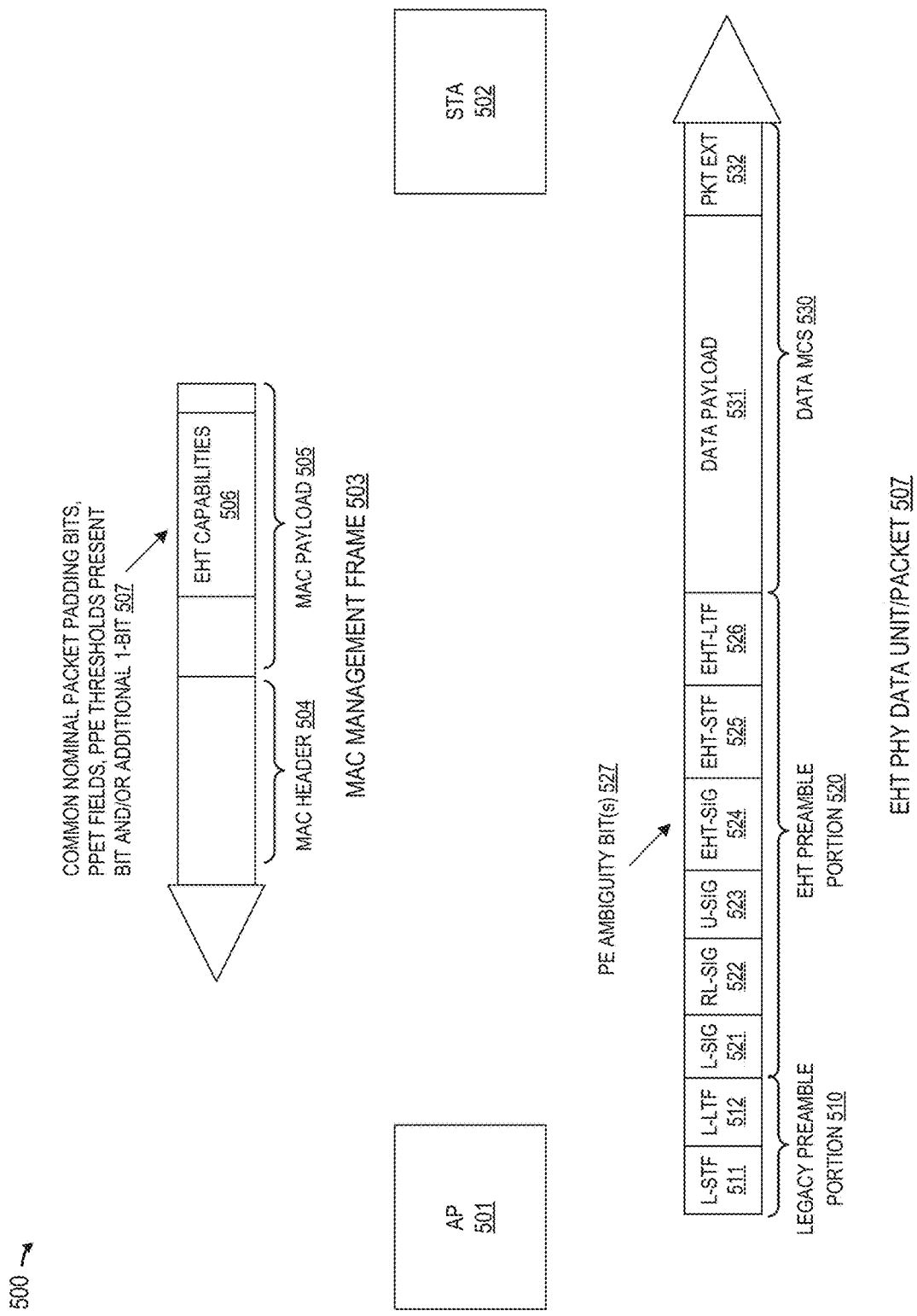
FIG. 5 is a diagrammatic illustration of an AP and STA which exchange a MAC control management frame to signal STA-supported padding capabilities so that the AP can generate an EHT PHY data unit frame which includes packet extensions based on the STA-supported padding capabilities in accordance with selected embodiments of the present disclosure.

To provide additional details for an improved understanding of selected embodiments of the present disclosure, reference is now made to FIG. 5 which diagrammatically illustrates a wireless communication system 500 with an AP 501 and STA 502 which exchange a MAC control management frame 503 to signal STA-supported padding capabilities so that the AP 501 can generate an EHT PHY data unit frame 507 which includes packet extensions based on the STA-supported padding capabilities. As disclosed, each station (e.g., STA 502) may be configured to transmit the MAC management frame 503 to signal its packet padding capabilities or requirements to a transmitting station (e.g., AP 501), where the MAC management frame 503 conforms to the 802.11be communication protocol and includes a MAC header portion 504 and MAC payload portion 505. In selected embodiments, the MAC payload portion 505 includes an EHT Capabilities element 506 whereby the STA 502 signals its packet padding requirements with a number of fields. In the EHT Capabilities element 506, the packet padding requirements are signaled with one or more information fields 507 which include a common nominal packet padding field, a PPET Thresholds field, and one or more PPET Thresholds Present Bits to indicate whether PPE thresholds are present. In addition, each station (e.g., AP 501) may be configured to transmit the EHT PHY data unit packet 507 to a receiving station (e.g., client station 502), where the data unit 507 conforms to the EHT communication protocol and occupies a specified bandwidth, such as 20 MHz, 40 MHz, 80 MHz, 160 MHz, 320 MHz, for example, or other suitable bandwidths, in other embodiments.

As shown, the data unit 507 includes a legacy preamble portion 510 and an EHT preamble portion 520. The legacy preamble portion 510 includes a legacy short training field (L-STF) 511 and a legacy long training field (L-LTF) 512. The EHT preamble portion 520 includes a legacy signal field (L-SIG) 521, a repeat legacy signal field (RL-SIG) 522, a long universal signal field (U-SIG) 523, an EHT signal field (EHT-SIG) 524, an EHT short training field (EHT-SFT) 525, and an EHT long training field (EHT-LTF) 526. Each of the L-STF 511, the L-LTF 512, the L-SIG 521, the RL-SIG 522, the U-SIG 523, the EHT-SIG 524, the EHT-STF 525, and the EHT-LFT 526 includes an integer number of one or more OFDM symbols. For example, the U-SIG field 523 may include information specifying the bandwidth (BW) and puncture information. In addition, the EHT-SIG field 524 includes common information for all users that is not included in the U-SIG field 523, including the computed a-factor and PE ambiguity bit(s) 527 for decoding the data unit 507. To accommodate all the mentioned information and ensure detection reliability to all users, the EHT-SIG field 524 can use different MCS from data MCS(s) (and can occupy a variable number of symbols which are indicated in the U-SIG field 523). For example, the EHT-SIG field 524 may include a common field and a user-specified field. In the user-specific fields, there is information about MCS, the number of spatial streams Nss, coding, the duration of the guard interval (GI setting), RU/MRU configuration or allocation, etc. In some embodiments, the PHY data unit 507 also includes a data payload portion 530.

In the course of generating the EHT PHY data unit 507, the transmitter station (e.g., AP 501) generates the last symbol $N_{SYM}$ of the data payload portion 531 by identifying the closest quarter symbol or a-factor, and then computing pre-FEC padding bits which are appended to the excess information bits to reach the identified a-factor. By applying forward error correction (FEC) to the excess information bits and appended pre-FEC padding bits, the resulting FEC output bits are appended with post-FEC padding bits to reach the 4× symbol boundary. After applying OFDM modulation to the FEC output bits and appended post-FEC padding bits, the last symbol of the data payload portion 531 is generated.

In addition, the EHT PHY data unit 507 includes a packet extension field 532 which follows the data field 531 to provide extra time for the STA 502 to receive the EHT PHY data unit 507, finish decoding the data payload 531, and transmit a response (e.g., ACK or Block ACK) to acknowledge successful (or unsuccessful) receipt of the EHT PHY data unit 507. The benefit provided by including the PE field 532 arises from the requirement that a receiver station transmit the acknowledgement signal after a certain time period specified as a short interframe space (SIFS). However, with the higher data rate and advanced modulation technology of the EHT/802.11be communication protocol, there are a relatively larger number of bits in each OFDM symbol of the data field 531 of the data unit 507 for the receiver station 502 to process and decode, particularly when the data unit 507 is transmitted in a transmission mode corresponding to a relatively larger bandwidth (e.g., 80 MHz, 160 MHz, 320 MHz, etc.) and/or using relatively larger number of spatial stream (e.g., larger than 8) and/or using a modulation and coding scheme (MCS) with relatively larger modulation order and/or relatively high coding rate. By providing the PE field 532 with a suitable duration or length, the receiver station is provided "extra" time to process and decode OFDM symbols of the data portion 531 and to prepare an acknowledgement frame before expiration of the SIFS after the end of the data unit 507.

In selected embodiments, the PE field 532 may use any dummy time-domain signal of the required duration, such as for example, repeating a portion or entire last data symbol signal. In other embodiments, the PE field 532 includes one or more OFDM symbols generating using a normal tone spacing and a defined guard interval of (e.g., 0.8 μs), with the duration of each OFDM symbol being 4 μs. In such embodiments, dummy bits may be appended to the post-FEC padding bits prior to OFDM modulation, e.g., repeating a portion or the entire the modulated bits of the last OFDM symbol.

To alert or notify the receiver station 502 about the duration of the PE field 532, the EHT preamble portion 520 may include information identifying the presence and/or the length of the PE field 532 in the data unit 507. For example, one or more PE ambiguity bits 527 may be included in the EHT-SIG field 524 to assist the receiving station 502 with calculating the number of data symbols in the data unit 507 from the length indicated in the L-SIG field 521 and RL-SIG field 522, which includes the PE field 532. As will be appreciated, the receiver station 502 is not required to process and/or decode the PE field 532.

Figure 6:
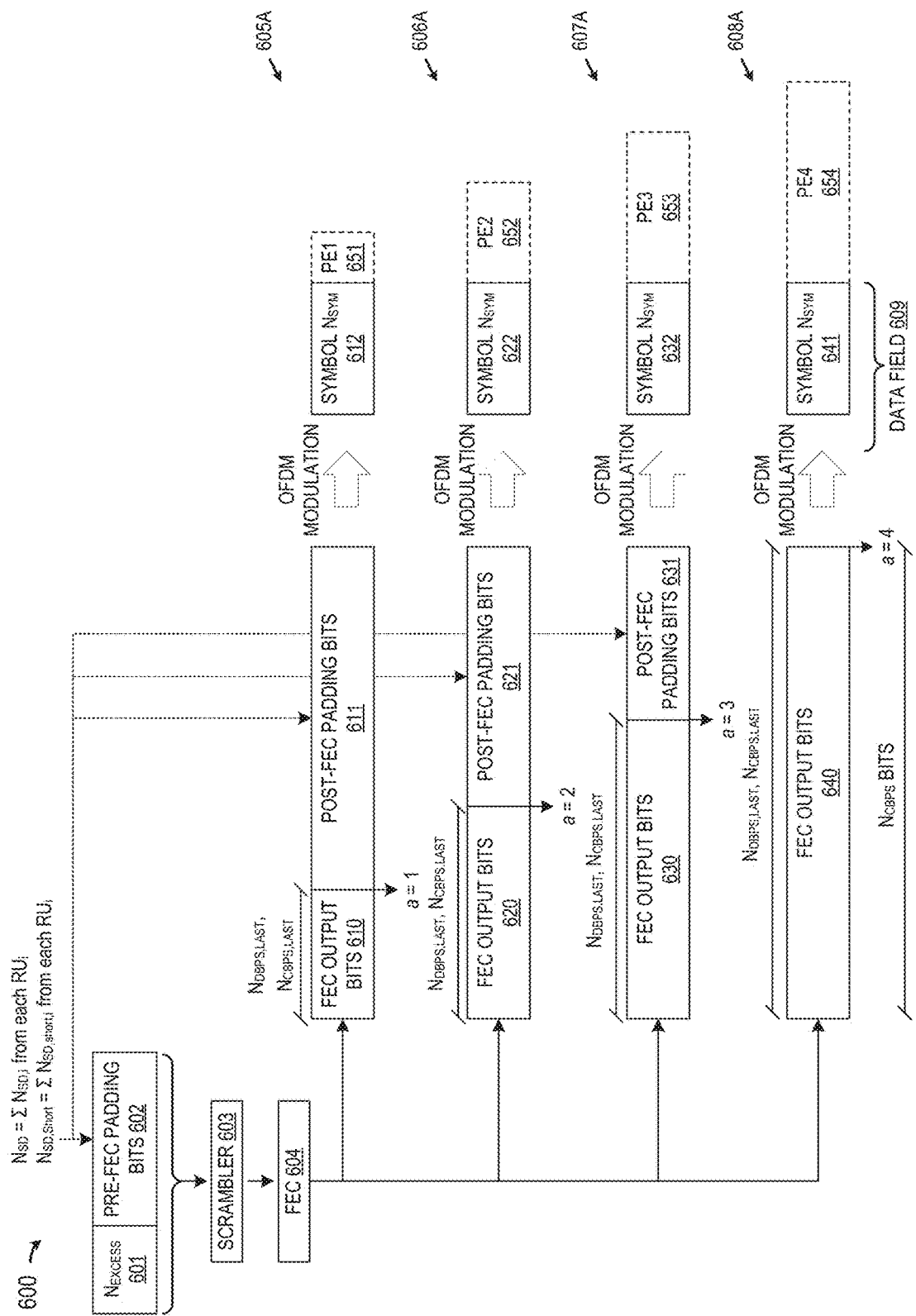
FIG. 6 is a diagrammatic illustration of EHT PHY data unit frames generated by a transmitter which computes packet extensions based on STA-supported padding capabilities in accordance with selected embodiments of the present disclosure.

To provide additional details for an improved understanding of selected first embodiments of the present disclosure, reference is now made to FIG. 6 which is a simplified diagrammatic illustration 600 of EHT PHY data unit frames 605A-608A generated by a transmitting station which computes packet extensions based on STA-supported padding capabilities. As a preliminary step, the transmitting station uses the excess information bits $N_{EXCESS}$ 601 and the expanded $N_{SD}$ and $N_{SD,short}$ values for new RU and MRU sizes to compute the initial a-factor $a_{int}$ having a value of 1, 2, 3, or 4 corresponding, respectively to a first boundary, second boundary, third boundary, or fourth boundary in the last OFDM symbol $N_{SYM}$ of the EHT data field 609. Based on the computed initial a-factor $a_{init}$, the transmitting station computes how many pre-FEC padding bits 602 should be appended to the excess information bits $N_{EXCESS}$ 601. After processing the excess information bits $N_{EXCESS}$ 601 and appended pre-FEC padding bits 602 with the scrambler 603 and FEC encoder 604, the transmitting station generates FEC output bits 610, 620, 630, 640 which extend, respectively, to the first, second, third, or fourth boundary in the last OFDM symbol $N_{SYM}$. For the a-factor having a value of 1, the transmitting station computes and appends post-FEC padding bits 611 to the FEC output bits 610 so that, upon OFDM modulation, the last OFDM symbol 612 of the EHT data field 609 is generated. Similarly, for the a-factor having a value of 2, the transmitting station computes and appends post-FEC padding bits 621 to the FEC output bits 620 so that, upon OFDM modulation, the last OFDM symbol 622 of the EHT data field 609 is generated. And for the a-factor having a value of 3, the transmitting station computes and appends post-FEC padding bits 631 to the FEC output bits 630 so that, upon OFDM modulation, the last OFDM symbol 632 of the EHT data field 609 is generated. Finally, for the a-factor having a value of 4, the transmitting station does not append post-FEC padding bits to the FEC output bits 640 (since they already reach the 4× symbol boundary), in which case the OFDM modulation generates the last OFDM symbol 641 of the EHT data field 609.

In addition to computing padding bits (e.g., 602, 611), the transmitting station may be configured to compute and append packet extension (PE) fields 651-654 to account for processing latencies at the receiver when processing EHT data fields which use larger bandwidths (e.g., 320 MHz) and more spatial streams (e.g., Nss=16). However, instead of using the 802.11ax approach which has a maximum packet extension of 16 μs, the transmitting station may be configured to append a larger PE field for 320 MHz and/or large Nss data packets when supported by the receiving station. To this end, each receiving station will be required to signal or indicate its padding extension requirement by capability exchange signaling. As disclosed herein, the capability signaling can occur during the initial association process by having each STA send an EHT capabilities element that includes either common nominal packet padding field values or PHY packet extension threshold (PPET) field values to signal a longer maximum packet extension value (e.g., 20 μs or 24 μs) for use with all constellations, Nss and RU allocations the STA supports, or for use with at least the STA-supported modes with constellation>1024, Nss>8 or RU/MRU>2*996.

Figure 7:
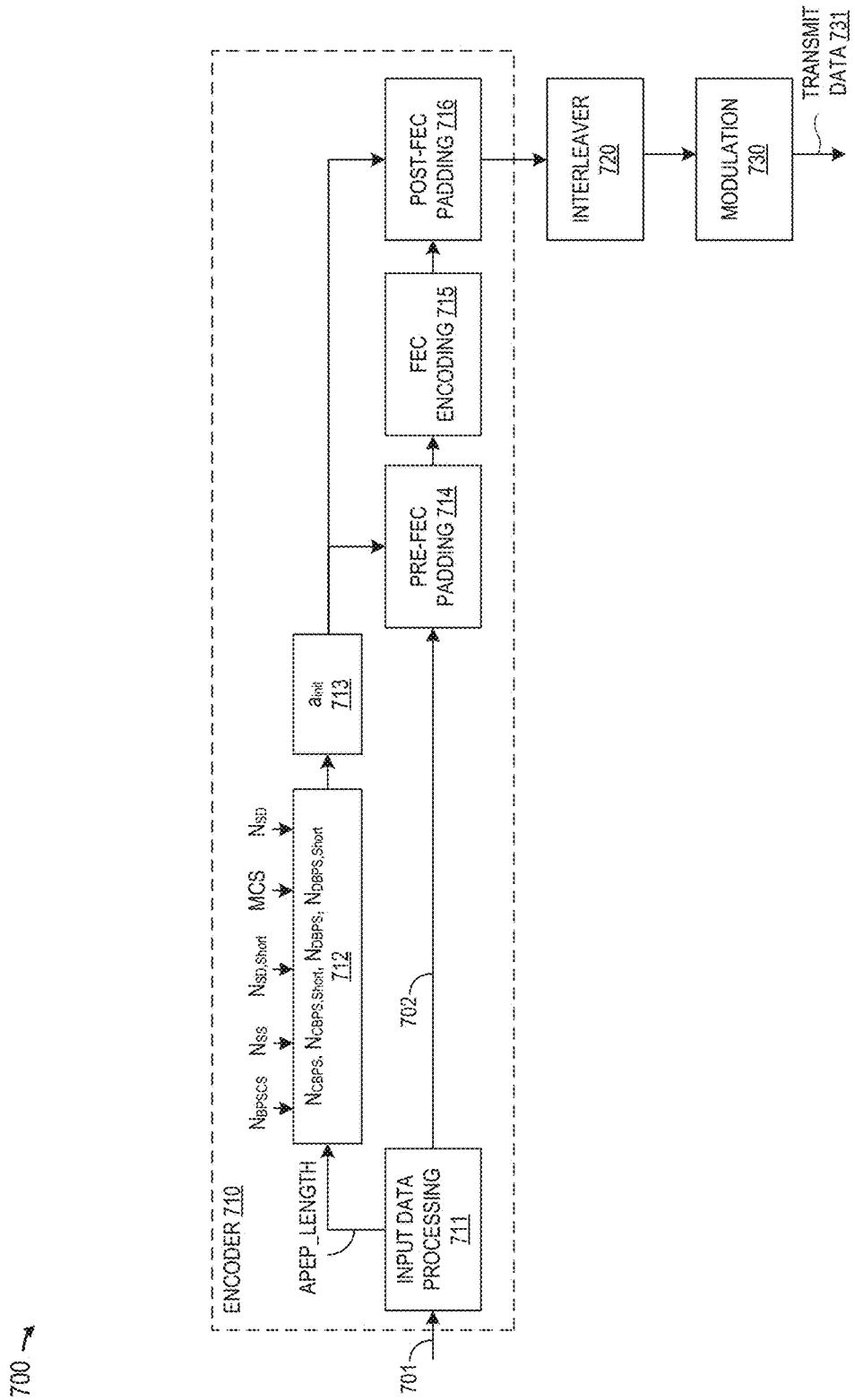
FIG. 7 is a block diagram illustrating a transceiver system that includes an EHT data encoder which employs a padding scheme in accordance with selected embodiments of the present disclosure.

To provide additional details for an improved understanding of selected embodiments of the present disclosure, reference is now made to FIG. 7 which is a block diagram illustrating a transceiver system 700 that includes an EHT data encoder 710 which employs a padding scheme. As depicted, the transceiver system 700 receives input data 701 from a source, such as a processor of the system. An encoder 710 at the transceiver 700 may include an input data processing module 711 to pre-process and output data bits 702 before forward error correcting (FEC) encoding. In addition to generating output data bits 702, the input data processing module 711 may determine one or more encoding parameters, such as the APEP_LENGTH parameter which is the A-MPDU length prior to end-of-frame MAC padding. The input data processing module 711 may also extract, compute, or otherwise obtain a first set of encoding parameters, including the number of coded bits per subcarrier per spatial stream ($N_{BPSCS}$), the number of spatial streams (Nss), the number of data subcarriers for each user that is allocated one or more resource units ($N_{SD}$), the number of data subcarriers for a short symbol from each resource unit ($N_{SD,short}$), and the modulation and coding scheme (MCS). In selected embodiments, the input data processing module 711 may retrieve the encoding parameters $N_{SD}$, $N_{SD,short}$ from a table of expanded $N_{SD}$ and $N_{SD,short}$ values which define subcarrier allocation related constants for RUs in an OFDMA EHT PPDU in accordance with the 802.11be standard. Based on the first set of encoding parameters, a first encoder computational unit 712 may compute a second set of encoding parameters, including the number of coded bits per data symbol ($N_{CBPS}=N_{SD} \times N_{SS} \times N_{BPSCS}$), the number of coded bits of a short symbol ($N_{CBPS,short}=N_{SD,short} \times N_{SS} \times N_{BPSCS}$), the number of data bits per symbol ($N_{DBPS}=N_{CBPS} \times R$), and the number of data bits of a short symbol ($N_{DBPS,short}=N_{CBPS,short} \times R$). Finally, the second set of encoding parameters are processed by the a-factor computation unit 713 to compute an initial a-factor ($a_{init}$).

At the encoder 710, the initial a-factor ($a_{init}$) is provided to a pre-FEC padding module 714 which is connected to compute a number of pre-FEC padding bits for padding information bits before passing the padded bits to the FEC encoding module 715. The initial a-factor ($a_{init}$) is also provided to a post-FEC padding module 716 which is connected to fill up the last OFDM symbol by appending post-FEC padding bits (e.g., with zero-padding bits). The padded data symbols may then be passed on to the interleaver 720 and modulation module 730 before transmitting the data 731. The data 731 may be modulated symbols output by modulation module 730.

In selected embodiments, a packet extension module (not shown) may be connected to the interleaver 720 to provide a packet extension field which is appended to the padded data symbols before being passed to the modulator. Alternatively, the packet extension module may provide a packet extension field which is appended to the modulated symbols output by modulation module 730. In either case, the packet extension module may use maximum nominal packet extension values (e.g., 20 μs or 24 μs) that are longer than the 802.11ax-supported PE values (e.g., 16 μs). However, the receiving station must signal a capability for supporting the longer maximum nominal packet extension values, such as by sending an EHT capabilities element that includes a common nominal packet padding field or a PPET Thresholds field which indicates the requirement for appending the longer maximum nominal packet extension values.

Figure 8:
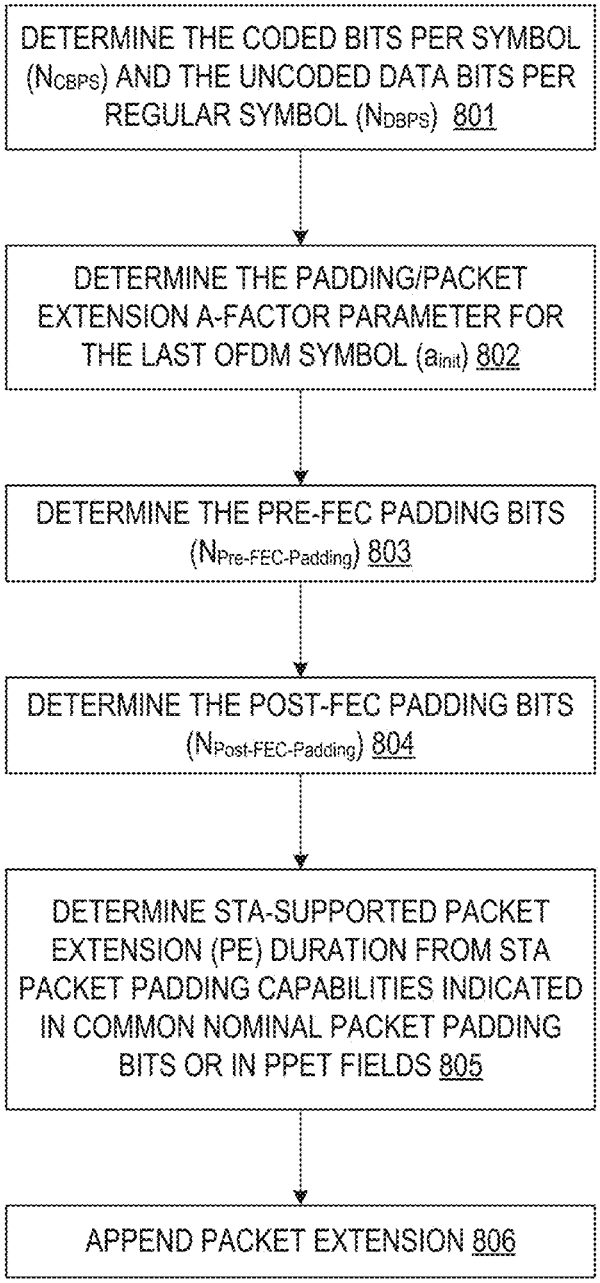
FIG. 8 depicts an exemplary logic flow diagram illustrating a packet extension procedure implemented with an EHT encoder in accordance with selected embodiments of the present disclosure.

To provide additional details for an improved understanding of selected embodiments of the present disclosure, reference is now made to FIG. 8 which depicts an exemplary logic flow diagram 800 to illustrate the operation of a wireless communication station (STA) device which uses an EHT encoder to implement a padding and packet extension procedure. At 801, an encoder may determine the number of coded bits and uncoded data bits per symbol for regular symbol and short symbol. For example, the encoder may determine the coded bits per symbol ($N_{CBPS}$) for a user u based on the computation of $N_{CBPS(u)}=N_{SD(u)} \times N_{SS(u)} \times N_{BPSCS(u)}$, where $N_{CBPS(u)}$ denotes the number of coded bits per symbol in a 4× symbol for user u, where $N_{SD(u)}$ denotes the number of scheduled data subcarriers in a 4× symbol for user u, where $N_{SS(u)}$ denotes the number of special strings in a 4× symbol for user u, and where $N_{BPSCS(u)}$ denotes the number of coded bits per subcarrier per spatial streams in a 4× symbol for user u, u=0, 1, 2, 3, etc. The encoder may also determine the uncoded data bits per symbol ($N_{DBPS}$) based on the computation $N_{DBPS(u)}=N_{CBPS(u)} \times R_{(u)}$, where $N_{DBPS(u)}$ denotes the number of data bits per symbol in a 4× symbol for user u, and where R denotes the coding rate for user u. Similarly, the encoder may determine the coded bits per symbol for short symbol ($N_{CBPS,short}$) as $N_{CBPS,short(u)}=N_{SD,short(u)} \times N_{SS(u)} \times N_{BPSCS(u)}$ and the uncoded data bits per symbol for short symbol ($N_{DBPS,short}$) as $N_{DBPS,short(u)}=N_{CBPS,short(u)} \times R_{(u)}$. It is noted that for all the defined parameters, the values can be configured differently for a specific user u, and the subscript "u" may be adopted or skipped interchangeably throughout the disclosure. Specifically, when single user (SU) or multi-user (MU) multiple-input multiple-output (MIMO) system with physical protocol data unit (PPDU) is employed, $N_{SD}$ denotes the number of available data subcarriers.

At 802, the encoder may start a pre-FEC padding procedure by determining a padding or packet extension a-factor parameter ($a_{init}$) for the last OFDM symbol (i.e., a short symbol) based on the equation from the 802.11ax standard:

$$a_{init} = \begin{cases} 4, & \text{if } N_{Excess} = 0 \\ \min\left(\left\lceil \frac{N_{Excess}}{m_{STBC} \cdot N_{DBPS,short}} \right\rceil, 4\right), & \text{otherwise} \end{cases}$$

where the excess information bits $N_{EXCESS}=\mod(8 \times APEP\_LENGTH + N_{Tail} + N_{service}, m_{STBC} \times N_{DBSP})$, where $N_{DBPS,short}=N_{CBPS,short} \times R$, and where $m_{STBC}$ is a space time block coding factor. However, instead of making the computation using the padding parameters $N_{SD}$, $N_{SD,short}$, $N_{DBPS}$ and $N_{DBPS,short}$ defined in the 802.11ax standard, the computation performed at step 802 uses updated $N_{SD}$, $N_{SD,short}$, $N_{DBPS}$ and $N_{DBPS,short}$ parameters which are defined to allow MRUs to be assigned to a single user/receiver station. To support assignment of MRUs to one user for full-bandwidth puncture and OFDMA cases, the updated $N_{SD}$ and $N_{SD,short}$ parameters may be defined to include allowed $N_{SD}$ and $N_{SD,short}$ parameters from the 802.11ax standard, and to also include new $N_{SD}$ and $N_{SD,short}$ parameters for RU combinations of allowed RU sizes from the 802.11ax standard, where each new $N_{SD}$ and $N_{SD,short}$ parameter is defined as the sum of the allowed $N_{SD}$ and $N_{SD,short}$ parameters from the 802.11ax standard for the allowed RUs being combined.

At 803, the encoder determines the pre-FEC padding bits. For example, the number of data bits of the last symbol can be computed as $N_{DBPS,last}=a_{init} \times N_{DBPS,short}$. In addition, the number of padding bits can computed as $N_{Pre-FEC-Padding}=N_{DBPS,last}-N_{EXCESS}$. The pre-FEC padding bits are appended to align the coded excess information bits $N_{EXCESS}$ to one of four padding boundaries which correspond to the computed a-factor, and then FEC encoding is performed to generate FEC output bits.

At 804, the encoder determines the post-FEC padding bits for the last OFDM symbol. For example, for a non-short padding scenario (e.g., when the a-factor $a_{init}=4$), the last symbol can be modulated in the same way as a regular long symbol. However, with a short padding scenario (e.g., when the a-factor $a_{init}=1, 2$ or 3), the computed post-FEC padding bits are added to the FEC output bits to fill up the last symbol before modulating the PPDU data packet for transmission.

At 805, the encoder determines the duration of the packet extension (PE) for the PPDU data packet which will be used to extend the PPDU energy over a longer duration of time to allow the receiver station to process the coded information in the PPDU packet within the required time frame for responding to the transmitting station. In selected embodiments, the computation of the PE duration may be based at least in part on the receiving station's packet padding capabilities which are signaled or indicated with common nominal packet padding bits or PPET fields conveyed by the receiving station in an EHT capabilities element. For example, for a non-short padding scenario (e.g., when the a-factor $a_{init}=4$), the number of PE bits (or PE field duration) may be computed as the nominal maximum nominal packet extension value that is signaled to be a STA-supported PE duration. However, with a short padding scenario (e.g., when the a-factor $a_{init}=1, 2$ or 3), the number of PE bits may be computed by scaling down or reducing the duration of the nominal maximum nominal packet extension value.

At 806, the encoder appends the packet extension (PE) to the data field of the PPDU data packet before or after performing OFDM modulation.

Figure 9:
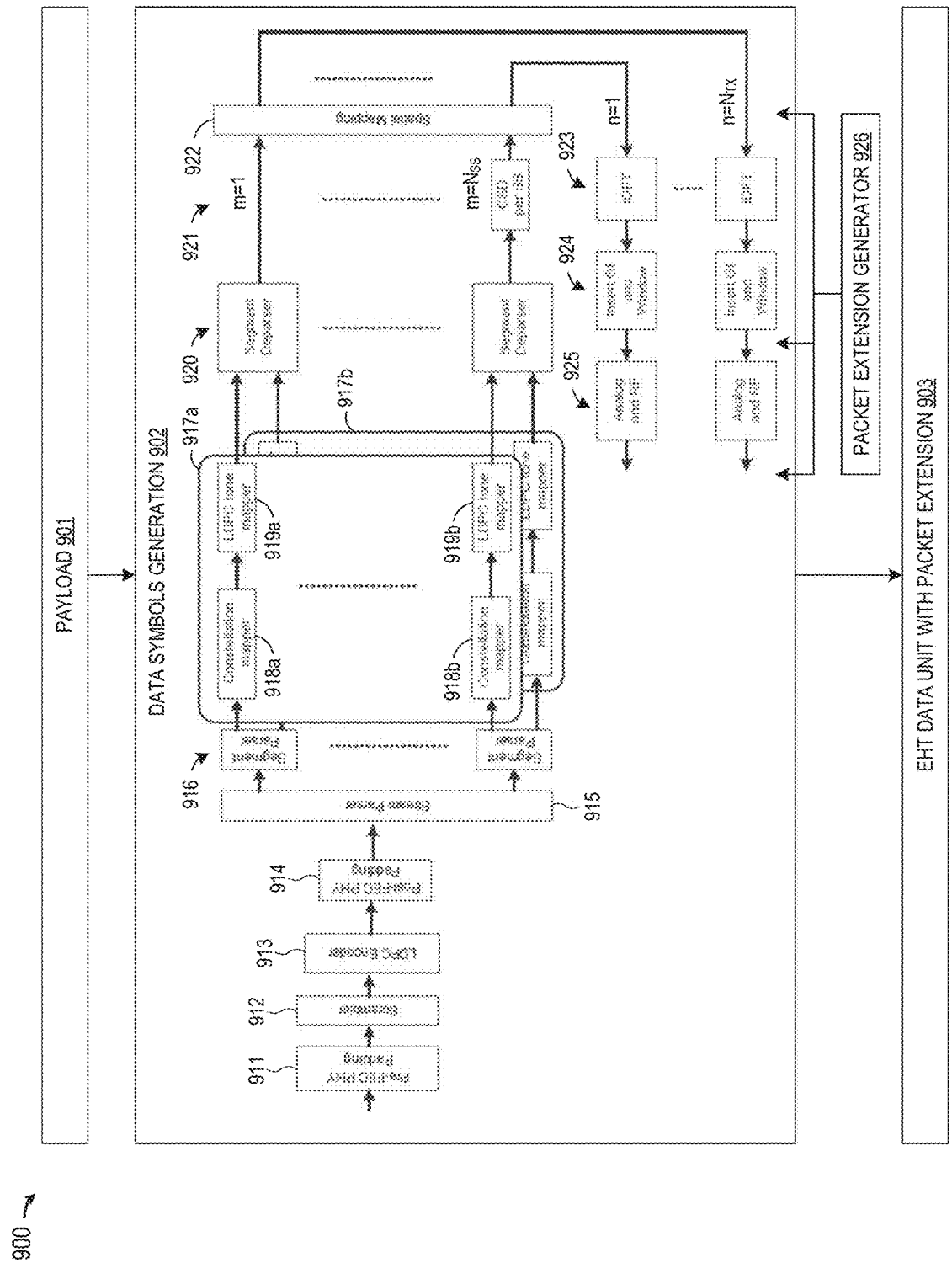
FIG. 9 depicts a simplified transmitter block diagram of a PHY processing unit used to generate an EHT data unit with a packet extension field in accordance with selected embodiments of the present disclosure.

To provide additional details for an improved understanding of selected embodiments of the present disclosure, reference is now made to FIG. 9 which depicts a simplified transmitter block diagram of a PHY processing unit 900 which includes a data symbols generation unit 902 that is connected to receive payload data 901 and to generate an EHT data unit with a packet extension field 903. The depicted PHY processing unit 902 is configured to generate data units, such as the EHT PHY data unit 507 of FIG. 5, though other suitable data units having different formats and field formats can be used. As depicted, the PHY processing unit 900 includes a processing path 911-922 in the data symbols generation unit 902 which includes a pre-FEC PHY padding unit 911, a scrambler 912, one or more LDPC or FEC encoders 913, a post-FEC PHY padding unit 914, a stream parser 915, segment parsers 916, constellation mappers 918a-b, LDPC tone mappers 919a-b, segment deparsers 920, cyclic shift diversity (CSD) per spatial stream units 921 and a spatial mapping unit 922. As will be appreciated that, in some embodiments, some of the components of the processing path 911-922 may be bypassed or omitted or other components may be added or substituted. Further, it will be appreciated that in embodiments where PHY processing unit 900 is configured to generate multi-user data units, there may be multiple parallel processing paths, with each path corresponds to a particular client station, to which the multi-user data unit is to be transmitted.

As described hereinabove, the pre-FEC PHY padding unit 911 adds one or more padding bits to an information bit stream by performing the computation described herein for using updated $N_{SD}$, $N_{SD,short}$, $N_{DBPS}$ and $N_{DBPS,short}$ parameters which are defined to allow MRUs to be assigned to a single user/receiver station. The padded information bit stream generated by the padding unit 911 is provided to the scrambler 912 which generally scrambles the information bit stream to reduce occurrences of long sequences of ones or zeros. The scrambled (padded) information bit stream is provided to the LDPC encoder 913 which performs forward error correction encoding, thereby generating FEC encoded bits for output to the post-FEC PHY padding unit 914. While a single FEC encoder 913 is shown, additional FEC encoders may be used. While an LDPC encoder is shown, the FEC encoder 913 may be a binary convolutional coder (BCC).

In addition, the post-FEC PHY padding unit 914 adds one or more padding bits to the FEC encoded bits prior to providing the information bit stream to the stream parser 915 which parses the one or more encoded streams into $N_{SS}$ spatial streams for separate interleaving and mapping into constellation points/symbols. In one embodiment, the stream parser 915 operates according to the IEEE 802.11be standard. Each of the Nss spatial streams is provided to a corresponding segment parser 916 which parses the coded bits into multiple segments. In an embodiment, each segment parser 916 parses coded bits at an output of the stream parser 915 into a plurality of segments corresponding to a plurality of frequency sub-bands of the communication channel for which the data unit is being generated. With reference to an example 40 MHz wide communication channel, each segment parser 916 parses coded bits at an output of the stream parser 915 to two segments corresponding to two 20 MHz frequency sub-bands of the 40 MHz channel. While each segment parser 916 is shown as a two segment parser having two outputs, it will be appreciated that each segment parser 916 may parse coded bits into a number of segments greater than two.

Coded bits corresponding to each spatial stream and each segment are operated on by a respective constellation mapper 918a-918b, each of which maps a sequence of bits to constellation points corresponding to different subcarriers/tones of an OFDM symbol. In selected embodiments, for each spatial stream and each segment, a constellation mapper 918 translates every bit sequence of length $\log_2(M)$ into one of M constellation points. The constellation mapper 918 handles different numbers of constellation points depending on the MCS being utilized. In selected embodiments, the constellation mapper 918 is a quadrature amplitude modulation (QAM) mapper that handles different modulation schemes corresponding to one or more of M=2, 4, 16, 64, 256, 1024, and 4096.

Each LDPC tone mapper 919a, 919b reorders constellation points corresponding to a spatial stream and a segment according to a tone remapping function which functionally maps consecutive coded bits or blocks of information bits onto nonconsecutive tones in the OFDM symbol to facilitate data recovery at the receiver in cases in which consecutive OFDM tones are adversely affected during transmission.

Outputs of LDPC tone mappers 919 corresponding to respective spatial stream are provided to respective segment deparsers 920. Each segment deparser 920 merges the outputs of the LDPC tone mappers 919 corresponding to a spatial stream. In addition, cyclic shift diversity (CSD) units 921 may be coupled to the segment deparsers 920. The CSD units 921 insert cyclic shifts into outputs from all but one of the segment deparsers 920 (if more than one space-time stream) to prevent unintentional beamforming.

The spatial mapping unit 922 maps the $N_{SS}$ spatial streams to $N_{TX}$ transmit chains. In various embodiments, spatial mapping may include 1) direct mapping, in which constellation points from each space-time stream are mapped directly onto transmit chains (i.e., one-to-one mapping); 2) spatial expansion, in which vectors of constellation points from all space-time streams are expanded via matrix multiplication to produce inputs to the transmit chains; and/or 3) beamforming, in which each vector of constellation points from all of the space-time streams is multiplied by a matrix of steering vectors to produce inputs to the transmit chains. Each output of the spatial mapping unit 922 corresponds to a transmit chain, and each output of the spatial mapping unit 922 is operated on by an IDFT calculation unit 923 (e.g., an inverse fast Fourier transform (IFFT) calculation unit) that converts a block of constellation points to a time-domain signal. In an embodiment in which the PHY processing unit 900 includes multiple processing paths 911-922 corresponding to multiple receivers of an OFDMA data unit, each IDFT calculation unit 923 includes multiple inputs corresponding to outputs of the multiple processing paths 911-922. In such embodiments, each IDFT calculation unit 923 jointly performs IDFT for all of the receivers on the OFDMA data unit.

Outputs of the IDFT units 923 are provided to GI insertion and windowing units 924 that prepend, to OFDM symbols, a guard interval (GI) portion which is a circular extension of an OFDM symbol in an embodiment, and smooth the edges of OFDM symbols to increase spectral delay. Outputs of the GI insertion and windowing units 824 are provided to analog and radio frequency (RF) units 925 that convert the signals to analog signals and upconvert the signals to RF frequencies for transmission. The signals are transmitted in a 20 MHz, a 40 MHz, an 80 MHz, a 160 MHz, or a 320 MHz bandwidth channel, though other suitable channel bandwidths may be used.

In the PHY processing unit 900, the disclosed data symbols generation unit 902 illustrates an example arrangement of transmitter blocks 911-925 which process the payload 901 to generate the data payload for an EHT data unit in accordance with selected embodiments of the present disclosure. In addition, the PHY processing unit 900 may include a packet extension field generator 926 that is connected and configured to append a PE field to the last data symbol. As depicted, the packet extension field generator 926 may be implemented by adding dummy frequency-domain digital bits before the IDFT calculation units 923, by adding dummy time-domain digital samples after the GI insertion and windowing units 924, or add dummy analog signals after the analog and RF units 925.

In selected embodiments, a PE field is attached to data units conforming to all or some transmission modes (e.g., all channel bandwidths and all modulation and coding schemes) defined by the EHT communication protocol. In addition, the length and duration of the PE fields may be determined at the transmitting station based on encoding parameters defined by the EHT communication protocol and based on packet extension capabilities signaled by each receiving station. In selected embodiments, the transmitting station may use the computed packet padding a-factor ($a_{init}$) to determine the duration of the PE field on the basis of a nominal packet extension value nominalPE and a decrement value D (e.g., 4 μs). For example, the transmitting station may compute the duration of the PE field with the following values:

| PE Field Duration |
| --- |
| nominalPE – when $a_{init} = 4$ |
| nominalPE – D when $a_{init} = 3$ |
| nominalPE – 2D when $a_{init} = 2$ |
| nominalPE – 3D when $a_{init} = 1$ |

As will be appreciated, any suitable values may be used for the nominal packet extension value nominalPE and decrement value D. For example, when the nominal packet extension value nominalPE=16 μs and the decrement value D=4 μs, then the PE field duration values conform to the 802.11ax standard. In certain 802.11be data transmission cases (e.g., 320 MHz and/or large Nss) where the 802.11ax PE field duration values are not sufficient for the receiving station to timely return a response message (e.g., ACK), the packet extension field generator unit 926 can compute a longer duration nominal packet extension value nominalPE based on a packet extension capability signaled by the receiving station. In selected embodiments, the packet extension field generator unit 926 is configured to compute a longer duration packet extension value nominalPE in response to a common nominal packet padding field value which indicates a longer duration packet extension value (e.g., nominalPE=20 μs or 24 μs). In such embodiments, the longer duration packet extension value nominalPE may be used for all constellations, Nss, and RU allocations, or for at least the new 802.11be constellations, Nss, and RU allocations.

In other embodiments, the packet extension field generator unit 926 is configured to compute a longer duration packet extension value nominalPE in response to a PPE Threshold field value containing multiple MCS thresholds for use in determining when to use a longer duration packet extension value (e.g., nominalPE=20 μs or 24 μs) with specific bandwidth, Nss combinations. In such embodiments, the 802.11ax PPE Threshold field includes an expanded 4-bit Nss field (for identifying up to 16 space-time streams Nss), an expanded N-bit RU Index Bitmask field (e.g., for identifying N=6 specified RU sizes [242, 484, 996, 996*2, 996*3, 996*4]), and a PPE Thresholds Info field with a plurality of PPE threshold values for use in determining different packet padding extension values (including at least one longer, 802.11be packet extension value) for use with specific constellation, Nss, RU combination sub-groupings.

In other embodiments, the packet extension field generator unit 926 is configured to compute a longer duration packet extension value nominalPE in response to a PPE Threshold field value containing a plurality of PHY-Rate thresholds for use in determining when to use a longer duration packet extension value (e.g., nominalPE=20 μs or 24 μs). In such embodiments, a simplified PPE Threshold field does not include an Nss field or RU Index Bitmask field, but includes a PPE Thresholds Info field with a plurality of PHY_Rate thresholds for use in determining different packet padding extension values (including at least one longer, 802.11be packet extension value).

By now it should be appreciated that there has been provided an apparatus, method, and system for signaling a packet padding capability in a wireless area network in accordance with an Extremely High Throughput (EHT) communication protocol. In the disclosed methodology, a first STA device constructs a MAC control management frame to include an EHT capability element indicating whether a packet extension value longer than 16 μs is supported by the receiving station device, where one or more fields in the EHT capability element include (1) a common nominal packet padding field having a plurality of values to signal different packet extension values for use with all transmission constellations, spatial streams Nss, and resource unit (RU) allocations supported by the first STA device, including at least one packet extension value longer than 16 μs; and/or (2) a PHY packet extension threshold (PPET) field comprising a plurality of PPET values to signal packet extension values including at least one packet extension value longer than 16 μs. In selected embodiments, the common nominal packet padding field has a first value (to indicate that the first STA device supports a first packet extension value of 0 μs for all transmission constellations, Nss, and RU allocations), a second value (to indicate that the first STA device supports a second packet extension value of 8 μs for all transmission constellations, Nss, and RU allocations), a third value (to indicate that the first STA device supports a third packet extension value of 16 μs for at least transmission constellations≤1024-QAM, Nss≤8 and RU≤996*2), or a fourth value (to indicate that the first STA device supports a fourth packet extension value longer than 16 μs for at least transmission constellations>1024-QAM or Nss>8 or RU>996*2). For example, the fourth value of the common nominal packet padding field may indicate that the first STA device supports a fourth packet extension value of 20 μs or 24 μs. In addition or in the alternative, the fourth value of the common nominal packet padding field may indicate that the first STA device supports a fourth packet extension value longer than 16 μs for all transmission constellations, Nss, and RU allocations. In selected embodiments, the plurality of PPET values are compared at the second STA device to QAM values in a PPET QAM Table which includes a first set of index values 0-5 corresponding to transmission constellations supported by an IEEE 802.11ax protocol and an additional index value 6 corresponding to a 4096-QAM transmission constellation supported by an IEEE 802.11be protocol. In addition, the PPET field may include a 4-bit Nss field (to identify up to 16 spatial streams Nss), a 5-bit RU Index Bitmask field (to identify specified RU sizes [242, 484, 996, 996*2, 996*4]), and a PPE Thresholds Info field which includes a plurality of PPET values for each Nss and RU combination used to transmit data using the EHT communication protocol. In selected embodiments, each plurality of PPET values may include a first PPET value PPET1 (which is a first constellation transmission index threshold for applying a packet extension value of 8 μs), a second PPET value PPET2 (which is a second constellation transmission index threshold for applying a packet extension value of 16 μs), and a third PPET value PPET3 (which is a third constellation transmission index threshold for applying the packet extension value longer than 16 μs). In other embodiments, the plurality of PPET values for each Nss and RU allocation may include a PPET1 value and a PPET2 value to signal a first nominal packet extension value (be applied to a first group of transmissions having QAM constellation values QAM≥PPET1 && (QAM<PPET2||PPET2==7)); a second, larger nominal packet extension value (to be applied to a second group of transmissions having QAM constellation values QAM≥PPET1||PPET1==7) && (QAM≥PPET2 && QAM<6)); a third, larger nominal packet extension value longer than 16 μs (to be applied to a third group of transmissions having QAM constellation values QAM≥PPET1||PPET1==7) && (QAM≥PPET2 && QAM==6); and no packet extension value (to be applied to all remaining groups of transmission constellations). In other selected embodiments, the PPET field includes a first PHY_Rate value $PPET1_{PHY\_RATE}$ (specifying a first PHY_Rate threshold for applying a packet extension value of 8 µs), a second PHY_Rate value $PPET2_{PHY\_RATE}$ (specifying a second PHY_Rate threshold for applying a packet extension value of 16 µs), and a third $PPET3_{PHY\_RATE}$ (specifying a third PHY_Rate threshold for applying the packet extension value longer than 16 µs). In selected embodiments, the EHT capability element may also include a PPET Thresholds Present field to indicate whether EHT PPET values are present in the EHT capability element. In such embodiments, the PPET Thresholds Present field may include one bit having a meaning which depends on an 802.11ax-defined PPET Thresholds Present bit. In particular, the one bit has a first value to indicate that EHT PPET values are omitted in the EHT capability element if the 802.11ax-defined PPET Thresholds Present bit has a first value, and to indicate that both EHT PPET and HE PPET fields are not present if the 802.11ax-defined PPET Thresholds Present bit has a second value. In addition, the one bit has a second value to indicate that EHT PPET values are present in the EHT capability element. Subsequently, the first STA device sends the MAC control management frame to a second STA device which performs data communication with the first STA device by using the packet extension value longer than 16 µs when supported by the first STA device.

In another form, there has been provided an apparatus, method, and system for generating a PHY data frame at a first station (STA) device for transmission to a second STA device in a wireless area network in accordance with an Extremely High Throughput (EHT) communication protocol. In the disclosed methodology, the first STA device receives from the second STA device a MAC control management frame having an EHT capability element comprising one or more fields indicating whether a packet extension value longer than 16 µs is required by the second STA device to satisfy a processing-time constraint imposed by the second STA device. The disclosed methodology also processes the EHT capability element at the first STA device to extract the one or more fields which include (1) a common nominal packet padding field having a plurality of values to signal different packet extension values for use with all transmission constellations, spatial streams Nss, and resource unit (RU) allocations supported by the second STA device, including at least one packet extension value longer than 16 µs; and/or (2) a PHY packet extension threshold (PPET) field comprising a plurality of PPET values to signal packet extension values including at least one packet extension value longer than 16 µs. In selected embodiments, the common nominal packet padding field has a first value (to indicate that the second STA device supports a first packet extension value of 0 µs for all transmission constellations, Nss, and RU allocations), a second value (to indicate that the second STA device supports a second packet extension value of 8 µs for all transmission constellations, Nss, and RU allocations), a third value (to indicated that the second STA device supports a third packet extension value of 16 µs for at least transmission constellations≤1024-QAM, Nss≤8 and RU≤996*2) or a fourth value (to indicate that the second STA device supports a fourth packet extension value longer than 16 µs for at least transmission constellations≥1024-QAM or Nss≥8 or RU≥996*2). For example, the fourth value of the common nominal packet padding field may indicate that the second STA device supports a fourth packet extension value of 20 µs or 24 µs. In addition or in the alternative, the fourth value of the common nominal packet padding field may indicate that the second STA device supports a fourth packet extension value longer than 16 µs for all transmission constellations, Nss, and RU allocations. In selected embodiments, the plurality of PPET values are compared at the first STA device to QAM values in a PPET QAM Table which includes a first set of index values 0-5 corresponding to transmission constellations supported by an IEEE 802.11ax protocol and an additional index value 6 corresponding to a 4096-QAM transmission constellation supported by an IEEE 802.11be protocol. In addition, the PPET field may include a 4-bit Nss field (to identify up to 16 spatial streams Nss), a N-bit RU Index Bitmask field (to identify specified RU sizes, and a PPE Thresholds Info field which includes a plurality of PPET values for each Nss and RU combination used to transmit data using the EHT communication protocol. In selected embodiments, each plurality of PPET values may include a first PPET value PPET1 (which is a first constellation transmission index threshold for applying a packet extension value of 8 µs), a second PPET value PPET2 (which is a second constellation transmission index threshold for applying a packet extension value of 16 µs), and a third PPET value PPET3 (which is a third constellation transmission index threshold for applying the packet extension value longer than 16 µs). In other embodiments, the plurality of PPET values for each Nss and RU allocation may include a PPET1 value and a PPET2 value to signal a first nominal packet extension value (be applied to a first group of transmissions having QAM constellation values QAM≥PPET1 && (QAM<PPET2||PPET2==7)); a second, larger nominal packet extension value (to be applied to a second group of transmissions having QAM constellation values QAM≥PPET1||PPET1==7) && (QAM≥PPET2 && QAM<6)); a third, larger nominal packet extension value longer than 16 µs (to be applied to a third group of transmissions having QAM constellation values QAM≥PPET1||PPET1==7) && (QAM≥PPET2 && QAM==6); and no packet extension value (to be applied to all remaining groups of transmission constellations). In other selected embodiments, the PPET field includes a first PHY_Rate value $PPET1_{PHY\_RATE}$ (specifying a first PHY_Rate threshold for applying a packet extension value of 8 µs), a second PHY_Rate value $PPET2_{PHY\_RATE}$ (specifying a second PHY_Rate threshold for applying a packet extension value of 16 µs), and a third $PPET3_{PHY\_RATE}$ (specifying a third PHY_Rate threshold for applying the packet extension value longer than 16 µs). In selected embodiments, the EHT capability element may also include a PPET Thresholds Present field to indicate whether EHT PPET values are present in the EHT capability element. In such embodiments, the PPET Thresholds Present field may include one bit having a meaning which depends on an 802.11ax-defined PPET Thresholds Present bit. In particular, the one bit has a first value to indicate that EHT PPET values are omitted in the EHT capability element if the 802.11ax-defined PPET Thresholds Present bit has a first value, and to indicate that both EHT PPET and HE PPET fields are not present if the 802.11ax-defined PPET Thresholds Present bit has a second value. In addition, the one bit has a second value to indicate that EHT PPET values are present in the EHT capability element. In the case where the EHT PPET elements are omitted, the same packet extension thresholds as indicated in the 802.11ax PPET capability fields are used for the 802.11be data transmissions having Nss values less than or equal to the maximum 802.11ax Nsts value and for RU/MRU values less than or equal to the maximum 802.11ax RU value and for constellations other than 4096 QAM. However, in the case where the EHT PPET elements are omitted and 802.11be data transmissions for Nss values greater than the maximum 802.11ax Nsts value or for RU/MRU values greater than the maximum 802.11ax RU value or constellation is 4096 QAM, then one nominal packet extension value will be used. As will be appreciated, the 802.11ax standard uses "Nsts" as the defined term for space-time streams, while the 802.11be standard uses "Nss" as the defined term for spatial streams. In addition, the disclosed methodology generates an EHT PHY data frame at the first STA device for transmission to at least the second STA device comprising at least (i) one or more information and/or data fields, and (ii) a packet extension field having a duration that is longer than 16 μs that is computed from the one or more fields extracted from the EHT capability element.

In yet another form, there is provided a method and apparatus for transmitting orthogonal frequency division multiplexing (OFDM) symbols for a data unit in a wireless personal area network in accordance with IEEE 802.11be protocol. As disclosed, the apparatus includes a transceiver to exchange data with a wireless device, a processor, and a memory storing instructions. When executed by the processor, the instructions cause the apparatus to receive, from a first station (STA) device, a MAC control management frame having an EHT capability element comprising one or more fields indicating whether a packet extension value longer than 16 μs is required by the first STA device to satisfy a processing-time constraint imposed by the first STA device. In addition, the executed instructions cause the processor to process, at the apparatus, the EHT capability element to extract the one or more fields which include (1) a common nominal packet padding field having a plurality of values to signal different packet extension values for use with all transmission constellations, spatial streams Nss, and resource unit (RU) allocations supported by the first STA device, including at least one packet extension value longer than 16 μs; and/or (2) a PHY packet extension threshold (PPET) field which includes, for each Nss and RU combination used to transmit data to the first STA device using the IEEE 802.11be protocol, a plurality of PPET values to signal packet extension values including at least one packet extension value longer than 16 μs. The executed instructions also cause the processor to generate, by the apparatus, an EHT PHY data frame destined to at least the first STA device comprising at least (i) one or more information and/or data fields, and (ii) a packet extension field having a duration that is longer than 16 μs that is computed from the one or more fields extracted from the EHT capability element.

In still yet another form, there is provided a method and apparatus for a receiving station to signal a packet padding capability in a wireless area network in accordance with an Extremely High Throughput (EHT) communication protocol, such as the 802.11be protocol. As disclosed, the apparatus includes a transceiver to exchange data with a wireless device, a processor, and a memory storing instructions. When executed by the processor, the instructions cause the apparatus to construct, at the receiving station, a MAC control management frame having an EHT capability element comprising one or more fields indicating whether a packet extension longer than 16 μs is required by the receiving station to satisfy a processing-time constraint imposed by the receiving station. As disclosed, the one or more fields in the EHT capability element include (1) a common nominal packet padding field having a plurality of values to signal different packet extension values for use with all transmission constellations, spatial streams Nss, and resource unit (RU) allocations supported by the receiving STA device, including at least one packet extension value longer than 16 μs; and/or (2) a PHY packet extension threshold (PPET) field comprising, for each Nss and RU combination used to transmit data to the receiving station using the EHT communication protocol, a plurality of PPET values to signal packet extension values including at least one packet extension value longer than 16 μs. In selected embodiments, the common nominal packet padding field has a first value (to indicate that the receiving station supports a first packet extension value of 0 μs for all transmission constellations, Nss, and RU allocations), a second value (to indicate that the receiving station supports a second packet extension value of 8 μs for all transmission constellations, Nss, and RU allocations), a third value (to indicated that the receiving station supports a third packet extension value of 16 μs for at least transmission constellations≤1024-QAM, Nss≤8 and RU≤996*2) or a fourth value (to indicate that the receiving station supports a fourth packet extension value longer than 16 μs for at least transmission constellations≥1024-QAM or Nss≥8 or RU≥996*2). For example, the fourth value of the common nominal packet padding field may indicate that the receiving station supports a fourth packet extension value of 20 μs or 24 μs. In addition or in the alternative, the fourth value of the common nominal packet padding field may indicate that the receiving station supports a fourth packet extension value longer than 16 μs for all transmission constellations, Nss, and RU allocations. In selected embodiments, the plurality of PPET values are compared at the first station to QAM values in a PPET QAM Table which includes a first set of index values 0-5 corresponding to transmission constellations supported by an IEEE 802.11ax protocol and an additional index value 6 corresponding to a 4096-QAM transmission constellation supported by an IEEE 802.11be protocol. In addition, the PPET field may include a 4-bit Nss field (to identify up to 16 spatial streams Nss), a 5-bit RU Index Bitmask field (to identify specified RU sizes [242, 484, 996, 996*2, 996*4]), and a PPE Thresholds Info field which includes a plurality of PPET values for each Nss and RU combination used to transmit data using the EHT communication protocol. In addition, the executed instructions cause the processor to send the MAC control management frame from the receiving station to a first station which performs data communication with the receiving station by using the packet extension value longer than 16 μs when supported by the receiving station.

Although the described exemplary embodiments disclosed herein are directed to a wireless communication station (STA) devices which use MCS operation parameters to compute packet padding and extension bits in selected 802.11be-compliant wireless connectivity applications and methods for operating same, the present invention is not necessarily limited to the example embodiments which illustrate inventive aspects of the present invention that are applicable to a wide variety of circuit designs and operations. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the identification of the circuit design and configurations provided herein is merely by way of illustration and not limitation and other circuit arrangements and MCS operational parameters may be used in order to configure wireless communication devices with packet padding and extension bits. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts. When implemented in hardware, the hardware may comprise one or more of discrete components, an integrated circuit, an application-specific integrated circuit (ASIC), a programmable logic device (PLD), etc.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of signaling a packet padding capability in a wireless area network in accordance with an Extremely High Throughput (EHT) communication protocol, comprising:
   constructing a MAC control management frame by a first station (STA) device, the MAC control management frame comprising an EHT capability element comprising one or more fields indicating whether a packet extension value longer than 16 μs is supported by the first STA device, where the one or more fields comprise:
   a common nominal packet padding field having a plurality of values to signal different packet extension values for use with all transmission constellations, spatial streams Nss, and resource unit (RU) allocations supported by the first STA device, including at least one packet extension value longer than 16 μs; and/or
   a PHY packet extension threshold (PPET) field comprising a plurality of PPET values to signal packet extension values including at least one packet extension value longer than 16 μs; and
   sending the MAC control management frame from the first STA device to a second STA device which performs data communication with the first STA device by using the packet extension value longer than 16 μs when supported by the first STA device; where a first value of the common nominal packet padding field indicates that the first STA device supports a first packet extension value of 0 μs for all transmission constellations, Nss, and RU allocations; where a second value of the common nominal packet padding field indicates that the first STA device supports a second packet extension value of 8 μs for all transmission constellations, Nss, and RU allocations; where a third value of the common nominal packet padding field indicates that the first STA device supports a third packet extension value of 16 μs for at least transmission constellations≤1024-QAM, Nss≤8 and RU≤996*2; and where a fourth value of the common nominal packet padding field indicates that the first STA device supports a fourth packet extension value longer than 16 μs for at least transmission constellations>1024-QAM or Nss>8 or RU>996*2.

2. The method of claim 1, where the fourth value of the common nominal packet padding field indicates that the first STA device supports a fourth packet extension value of 20 μs or 24 μs.

3. The method of claim 1, where a fourth value of the common nominal packet padding field indicates that the first STA device supports a fourth packet extension value longer than 16 μs for all transmission constellations, Nss, and RU allocations.

4. The method of claim 1, where the PPET field comprises:
   a 4-bit Nss field for identifying up to 16 spatial streams Nss;
   a 5-bit RU Index Bitmask field for identifying specified RU sizes [242, 484, 996, 996*2, 996*4]; and
   a PPE Thresholds Info field comprising, for each Nss and RU combination used to transmit data using the EHT communication protocol, the plurality of PPET values.

5. The method of claim 4, where the plurality of PPET values comprise a first PPET value PPET1 which is a first constellation transmission index threshold for applying a packet extension value of 8 μs, a second PPET value PPET2 which is a second constellation transmission index threshold for applying a packet extension value of 16 μs, and a third PPET value PPET3 which is a third constellation transmission index threshold for applying the packet extension value longer than 16 μs.

6. The method of claim 4, where the plurality of PPET values comprises a PPET1 value and a PPET2 value to signal that for each Nss and RU allocation:
   a first nominal packet extension value is to be applied to a first group of transmissions having QAM constellation values QAM≥PPET1 && (QAM<PPET2∥PPET2==7);
   a second, larger nominal packet extension value is to be applied to a second group of transmissions having QAM constellation values QAM≥PPET1∥PPET1==7) && (QAM≥PPET2 && QAM<6);
   a third, larger nominal packet extension value longer than 16 μs is to be applied to a third group of transmissions having QAM constellation values QAM≥PPET1∥PPET1==7) && (QAM≥PPET2 && QAM==6; and
   no packet extension value is to be applied to all remaining groups of transmission constellations.

7. The method of claim 1, where the PPET field comprises a first PHY_Rate value $PPET1_{PHY\_RATE}$ which is a first PHY_Rate threshold for applying a packet extension value of 8 μs, a second PHY_Rate value $PPET2_{PHY\_RATE}$ which is a second PHY_Rate threshold for applying a packet extension value of 16 μs, and a third $PPET3_{PHY\_RATE}$ which is a third PHY_Rate threshold for applying the packet extension value longer than 16 μs.

8. The method of claim 1, where the EHT capability element further comprises a PPET Thresholds Present field to indicate whether EHT PPET values are present in the EHT capability element, where the PPET Thresholds Present field comprises one bit having a meaning which depends on an 802.11ax-defined PPET Thresholds Present bit;

where the one bit has a first value to indicate that EHT PPET values are omitted in the EHT capability element if the 802.11ax-defined PPET Thresholds Present bit has a first value, and to indicate that both EHT PPET and HE PPET fields are not present if the 802.11ax-defined PPET Thresholds Present bit has a second value;

where the one bit has a second value to indicate that EHT PPET values are present in the EHT capability element.

9. The method of claim 1, where the plurality of PPET values are compared at the second STA device to QAM values in a PPET QAM Table comprising a first set of index values 0-5 corresponding to transmission constellations supported by an IEEE 8.0211ax protocol and an additional index value 6 corresponding to a 4096-QAM transmission constellation supported by an IEEE 802.11be protocol.

10. A method for generating a PHY data frame at a first station (STA) device for transmission to a second STA device in a wireless area network in accordance with an Extremely High Throughput (EHT) communication protocol, comprising:

receiving, from the second STA device, a MAC control management frame having an EHT capability element comprising one or more fields indicating whether a packet extension value longer than 16 μs is required by the second STA device to satisfy a processing-time constraint imposed by the second STA device;

processing, at the first STA device, the EHT capability element to extract the one or more fields which comprise:

a common nominal packet padding field having a plurality of values to signal different packet extension values for use with all transmission constellations, spatial streams Nss, and resource unit (RU) allocations supported by the second STA device, including at least one packet extension value longer than 16 μs; and/or a PHY packet extension threshold (PPET) field comprising a plurality of PPET values to signal packet extension values including at least one packet extension value longer than 16 μs;

generating, by the first STA device, an EHT PHY data frame destined to at least the second STA device comprising at least (i) one or more information and/or data fields, and (ii) a packet extension field having a duration that is longer than 16 μs that is computed from the one or more fields extracted from the EHT capability element; where a first value of the common nominal packet padding field indicates that the second STA device supports a first packet extension value of 0 μs for all transmission constellations, Nss, and RU allocations; where a second value of the common nominal packet padding field indicates that the second STA device supports a second packet extension value of 8 μs for all transmission constellations, Nss, and RU allocations; where a third value of the common nominal packet padding field indicates that the second STA device supports a third packet extension value of 16 μs for at least transmission constellations≤1024-QAM, Nss≤8 and RU≤996*2; and where a fourth value of the common nominal packet padding field indicates that the second STA device supports a fourth packet extension value longer than 16 μs for at least transmission constellations>1024-QAM or Nss>8 or RU>996*2.

11. The method of claim 10, where the fourth value of the common nominal packet padding field indicates that the second STA device supports a fourth packet extension value of 20 μs or 24 μs.

12. The method of claim 10, where a fourth value of the common nominal packet padding field indicates that the second STA device supports a fourth packet extension value longer than 16 μs for all transmission constellations, Nss, and RU allocations.

13. The method of claim 10, where the PPET field comprises:

a 4-bit Nss field for identifying up to 16 spatial streams Nss;

a 5-bit RU Index Bitmask field for identifying specified RU sizes [242, 484, 996, 996*2, 996*4]; and a PPE Thresholds Info field comprising, for each Nss and RU combination used to transmit data using the EHT communication protocol, the plurality of PPET values.

14. The method of claim 13, where the plurality of PPET values comprise three PPET values for each Nss and RU/MRU allocation, comprising:

a first PPET value PPET1 which is a first constellation transmission index threshold for applying a packet extension value of 8 μs, a second PPET value PPET2 which is a second constellation transmission index threshold for applying a packet extension value of 16 μs, and a third PPET value PPET3 which is a third constellation transmission index threshold for applying the packet extension value longer than 16 μs.

15. The method of claim 13, where the plurality of PPET values comprises two PPET values, PPET1 and PPET2, for each Nss and RU/MRU allocation, which are used to apply rules such that:

a first nominal packet extension value of 8us is applied to a first group of transmissions having QAM constellation values QAM≥PPET1 && (QAM<PPET2|| PPET2==7);

a second nominal packet extension value of 16us is applied to a second group of transmissions having QAM constellation values QAM>PPET1|| PPET1==7) && (QAM>PPET2 && QAM<6);

a third nominal packet extension value longer than 16 μs is applied to a third group of transmissions having QAM constellation values QAM>PPET1|| PPET1==7) && (QAM>PPET2 && QAM==6); and no packet extension value is applied to all remaining groups of transmission constellations.

16. The method of claim 10, where the PPET field comprises a first PHY_Rate value $PPET1_{PHY\_RATE}$ which is a first PHY_Rate threshold for applying a packet extension value of 8 μs, a second PHY_Rate value $PPET2_{PHY\_RATE}$ which is a second PHY_Rate threshold for applying a packet extension value of 16 μs, and a third $PPET3_{PHY\_RATE}$ which is a third PHY_Rate threshold for applying the packet extension value longer than 16 μs.

17. The method of claim 10, where the EHT capability element further comprises a PPET Thresholds Present field to indicate whether EHT PPET values are present in the EHT capability element, where the PPET Thresholds Present field comprises one bit having a meaning which depends on an 802.11ax-defined PPET Thresholds Present bit;

where the one bit has a first value to indicate that EHT PPET values are omitted in the EHT capability element if the 802.11ax-defined PPET Thresholds Present bit has a first value, and to indicate that both EHT PPET and HE PPET fields are not present if the 802.11ax-defined PPET Thresholds Present bit has a second value; and where the one bit has a second value to indicate that EHT PPET values are present in the EHT capability element.

18. The method of claim 17, where generating the EHT PHY data frame, when the one bit indicates the EHT PPET values are omitted, comprises:

using 802.11ax-defined PPET values for EHT transmissions under an IEEE 802.11be protocol that are defined in the IEEE 802.11ax protocol; and using a single nominal packet extension value for EHT transmissions under the IEEE 802.11be protocol that are not defined in the IEEE 802.11ax protocol.

19. The method of claim 10, where the plurality of PPET values are compared at the first STA device to QAM values in a PPET QAM Table comprising a first set of index values 0-5 corresponding to transmission constellations supported by an IEEE 802.11ax protocol and an additional index value 6 corresponding to a 4096-QAM transmission constellation supported by an IEEE 802.11be protocol.

20. An apparatus for transmitting orthogonal frequency division multiplexing (OFDM) symbols for a data unit in a wireless personal area network in accordance with IEEE 802.11be protocol, comprising:

a transceiver to exchange data with a wireless device;
a processor; and
a memory storing instructions that, when executed by the processor, cause the apparatus to:
receive, from a first station (STA) device, a MAC control management frame having an EHT capability element comprising one or more fields indicating whether a packet extension value longer than 16 µs is required by the first STA device to satisfy a processing-time constraint imposed by the first STA device;
process, at the apparatus, the EHT capability element to extract the one or more fields which comprise:
a common nominal packet padding field having a plurality of values to signal different packet extension values for use with all transmission constellations, spatial streams Nss, and resource unit (RU) allocations supported by the first STA device, including at least one packet extension value longer than 16 µs; and/or
a PHY packet extension threshold (PPET) field comprising, for each Nss and RU combination used to transmit data to the first STA device using the IEEE 802.11be protocol, a plurality of PPET values to signal packet extension values including at least one packet extension value longer than 16 µs, where a first value of the common nominal packet padding field indicates that the second STA device supports a first packet extension value of 0 µs for all transmission constellations, Nss, and RU allocations; where a second value of the common nominal packet padding field indicates that the second STA device supports a second packet extension value of 8 µs for all transmission constellations, Nss, and RU allocations; where a third value of the common nominal packet padding field indicates that the second STA device supports a third packet extension value of 16 µs for at least transmission constellations<1024-QAM, Nss<8 and RU<996*2; and where a fourth value of the common nominal packet padding field indicates that the second STA device supports a fourth packet extension value longer than 16 µs for at least transmission constellations>1024-QAM or Nss>8 or RU>996*2;

generate, by the apparatus, an EHT PHY data frame destined to at least the first STA device comprising at least (i) one or more information and/or data fields, and (ii) a packet extension field having a duration that is longer than 16 µs that is computed from the one or more fields extracted from the EHT capability element.

21. A receiving station for signaling a packet padding capability in a wireless area network in accordance with an Extremely High Throughput (EHT) communication protocol, comprising:

a transceiver to exchange data with a wireless device;
a processor; and
a memory storing instructions that, when executed by the processor, cause the apparatus to:
construct, at the receiving station, a MAC control management frame having an EHT capability element comprising one or more fields indicating whether a packet extension longer than 16 µs is required by the receiving station to satisfy a processing-time constraint imposed by the receiving station, where the one or more fields comprise:
a common nominal packet padding field having a plurality of values to signal different packet extension values for use with all transmission constellations, spatial streams Nss, and resource unit (RU) allocations supported by the receiving STA device, including at least one packet extension value longer than 16 µs; and/or
a PHY packet extension threshold (PPET) field comprising, for each Nss and RU combination used to transmit data to the receiving station using the EHT communication protocol, a plurality of PPET values to signal packet extension values including at least one packet extension value longer than 16 µs; and
send the MAC control management frame from the receiving station to a first station which performs data communication with the receiving station by using the packet extension value longer than 16 µs when supported by the receiving station; where a first value of the common nominal packet padding field indicates that the receiving station supports a first packet extension value of 0 µs for all transmission constellations, Nss, and RU allocations; where a second value of the common nominal packet padding field indicates that the receiving station supports a second packet extension value of 8 µs for all transmission constellations, Nss, and RU allocations; where a third value of the common nominal packet padding field indicates that the receiving station supports a third packet extension value of 16 µs for at least transmission constellations≤1024-QAM, Nss≤8 and RU≤996*2; and where a fourth value of the common nominal packet padding field indicates that the receiving station supports a fourth packet extension value longer than 16 µs for at least transmission constellations>1024-QAM or Nss>8 or RU>996*2.

22. The receiving station of claim 21, where the EHT communication protocol is an IEEE 802.11be protocol.

23. The receiving station of claim 21, where the fourth value of the common nominal packet padding field indicates that the receiving station supports a fourth packet extension value of 20 µs or 24 µs.

24. The receiving station of claim 21, where a fourth value of the common nominal packet padding field indicates that the receiving station supports a fourth packet extension value longer than 16 μs for all transmission constellations, Nss, and RU allocations.

25. The receiving station of claim 21, where the PPET field comprises:
- a 4-bit Nss field for identifying up to 16 spatial streams Nss;
- a 5-bit RU Index Bitmask field for identifying specified RU sizes [242, 484, 996, 996*2, 996*4]; and
- a PPE Thresholds Info field comprising, for each Nss and RU combination used to transmit data using the EHT communication protocol, the plurality of PPET values.

* * * * *